United States Patent
Shankel et al.

(10) Patent No.: US 11,954,745 B2
(45) Date of Patent: Apr. 9, 2024

(54) SYSTEMS AND METHODS FOR OMNICHANNEL ARTIFICIAL INTELLIGENCE (AI) RESTAURANT MANAGEMENT

(71) Applicant: Fresh Technology, Inc., Birmingham, AL (US)

(72) Inventors: Shaun Shankel, Nashville, TN (US); David Corts, Nashville, TN (US); Tracy Reinker, Atlanta, GA (US); Paul Signorelli, Danbury, CT (US)

(73) Assignee: Fresh Technology, Inc., Birmingham, AL (US)

( * ) Notice: Subject to any disclaimer, the term of this patent is extended or adjusted under 35 U.S.C. 154(b) by 0 days.

(21) Appl. No.: 18/108,603

(22) Filed: Feb. 11, 2023

(65) Prior Publication Data

US 2023/0252590 A1 Aug. 10, 2023

Related U.S. Application Data

(63) Continuation of application No. PCT/US2023/012855, filed on Feb. 10, 2023.

(60) Provisional application No. 63/308,924, filed on Feb. 10, 2022.

(51) Int. Cl.
*G06Q 50/12* (2012.01)
*G06Q 10/04* (2023.01)
*G06Q 10/0631* (2023.01)

(52) U.S. Cl.
CPC ............ *G06Q 50/12* (2013.01); *G06Q 10/04* (2013.01); *G06Q 10/06315* (2013.01)

(58) Field of Classification Search
CPC ... G06Q 50/12; G06Q 10/04; G06Q 10/06315
See application file for complete search history.

(56) References Cited

U.S. PATENT DOCUMENTS

| 10,467,559 | B1 | 11/2019 | Svenson et al. | |
|---|---|---|---|---|
| 2002/0095342 | A1* | 7/2002 | Feldman | G06Q 50/12 705/16 |
| 2004/0260513 | A1 | 12/2004 | Fitzpatrick et al. | |
| 2016/0189279 | A1* | 6/2016 | York | G06N 5/04 705/26.81 |
| 2021/0166298 | A1 | 6/2021 | Napper | |
| 2021/0201231 | A1 | 7/2021 | Mimassi | |
| 2021/0256592 | A1 | 8/2021 | Lee et al. | |
| 2023/0028538 | A1 | 1/2023 | Krishna et al. | |

FOREIGN PATENT DOCUMENTS

WO WO2022011433 1/2022

OTHER PUBLICATIONS

Zhu et al. "Order Fulfillment Cycle Time Estimation for On-Demand Food Delivery"; Aug. 2020; Retrieved from: https://www.researchgate.net/publication/343785565_Order_Fulfillment_Cycle_Time_Estimation_for_On-Demand_Food_Delivery.

(Continued)

*Primary Examiner* — A. Hunter Wilder

(74) *Attorney, Agent, or Firm* — Rowan Tree Law Group, PLLC; Carson C. K. Fincham

(57) ABSTRACT

Systems, methods, and/or articles of manufacture that utilize omnichannel Artificial Intelligence (AI) restaurant management modeling to accurately compute and update order fulfillment times in an omnichannel ordering environment.

12 Claims, 11 Drawing Sheets

(56) References Cited

OTHER PUBLICATIONS

Guillot "How McDonald's super sizes its data for an optimized supply chain" Apr. 23, 2019; Retrieved from: https://www.qsrmagazine.com/content/whats-next-big-tech-trend-restaurants-heres-what-experts-say.

Matthew "Streamlining Restaurant Operations with Technology" Nov. 28, 2022; Retrieved from: https://www.gourmetmarketing.net/blog/streamlining-restaurant-operations-technology.

QSR Staff "What's the Next Big Tech Trend for Restaurants? Here's What the Experts Say" Dec. 2022; Retrieved from: https://www.qsrmagazine.com/content/whats-next-big-tech-trend-restaurants-heres-what-experts-say.

* cited by examiner

SYSTEMS AND METHODS FOR OMNICHANNEL ARTIFICIAL INTELLIGENCE (AI) RESTAURANT MANAGEMENT

CROSS-REFERENCE TO RELATED APPLICATIONS

Benefit and priority under 35 U.S.C. § 120 is hereby claimed to, and this is a Continuation of, International Patent Application No. PCT/US23/12855 filed on Feb. 10, 2023 and titled "SYSTEMS AND METHODS FOR OMNICHANNEL ARTIFICIAL INTELLIGENCE (AI) RESTAURANT MANAGEMENT", which itself claims benefit and priority to U.S. Provisional Patent Application No. 63/308924 filed on Feb. 10, 2022 and titled "SYSTEMS AND METHODS FOR ARTIFICIAL INTELLIGENCE (AI) RESTAURANT MANAGEMENT", each of which is hereby incorporated by reference herein in the entirety.

SUMMARY

Embodiments of the invention provide systems, methods, and/or articles of manufacture that capture and process a plurality of inputs descriptive of restaurant operations and automatically update and adjust restaurant operation parameters based on Artificial Intelligence (AI)-based processing of the plurality of inputs.

BACKGROUND

Changes in the restaurant and food services industry due to the COVID-19 pandemic have been significant, with many food service establishments having gone out of business in a short amount of time. Those establishments that have managed to survive or that have been created anew, have encountered great difficulties in adapting to the new food service paradigm which includes dynamic changes in (i) the restaurant's ability to take reservations or even to fully seat a given capacity (e.g., due to current State and/or local mandates), (ii) the manner in which food orders are placed (with many more orders being placed online than previously), and (iii) the ability of the restaurant to fulfill orders from different ordering channels (e.g., due to staffing shortages, technical delays or difficulties, etc.).

BRIEF DESCRIPTION OF THE DRAWINGS

The figures depict embodiments for purposes of illustration only. One skilled in the art will readily recognize from the following description that alternative embodiments of the systems and methods illustrated herein may be employed without departing from the principles described herein, wherein.

DETAILED DESCRIPTION

I. Introduction

Figure 1:
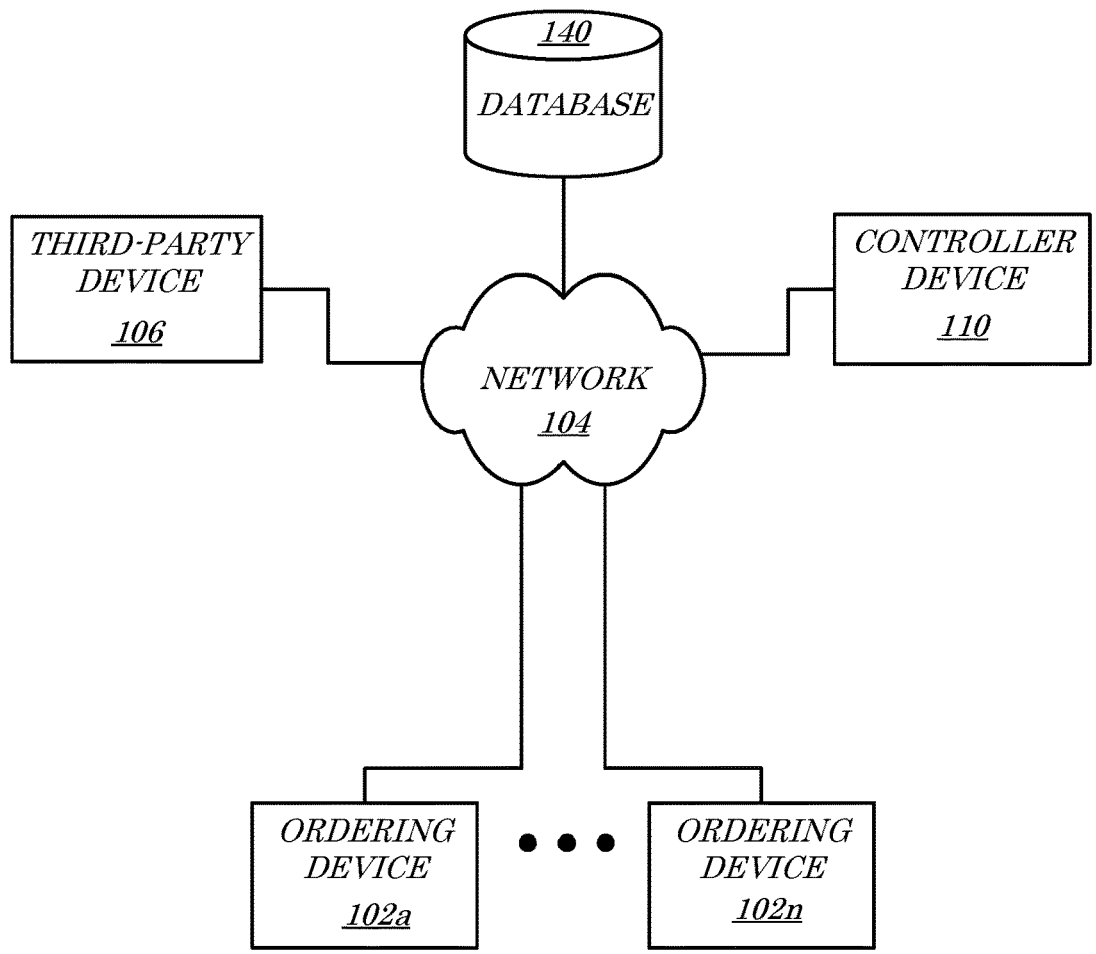
FIG. 1 is a block diagram of a system according to some embodiments.

While restaurants have historically been required to manage both in-person and take-away orders or dine-in customers and take-out customers, the ratio of dine-in and take-out orders for any particular restaurant was typically quite predictable. This predictability allowed establishments the foresight to plan staffing, inventory, and workflow to delivery an acceptable level of service to all customers. The highly dynamic and evolving nature of the current food service industry however, has fundamentally done away with this predictability, causing unacceptably long speed of service times, lost revenue (and reputation) due to refunded orders, wasted inventory due to lost, cancelled, and/or refunded orders, unhappy customers, and/or unhappy staff. One of the factors that has contributed to increased unpredictability is a more pronounced disparity between different order channels as well as an increase in the number of order channels. Orders requiring fulfillment may come from in-store customer interactions, self-service kiosks, customer's mobile devices, online ordering platforms, delivery service entities, and/or cloud-based Point-Of-Sale (POS) systems. These various order channels (e.g., "omnichannel" order sources) require different workflows, staffing, skills, and/or service times and the variability in volume amongst these channels has accordingly created great disruption to food service planning and accordingly has greatly diminished the quality of food service hospitality.

In accordance with embodiments herein, these and other deficiencies of previous solutions are remedied by providing systems, apparatus, methods, and articles of manufacture for omnichannel Artificial Intelligence (AI) restaurant management. The inventors have realized, for example, that many of the degradation of service issues that have been realized in the new food service paradigm are related to an inability of a restaurant to accurately predict when omnichannel orders will be ready. According to some embodiments, an omnichannel AI restaurant management model is created (e.g., trained and coded) to process a large number of inputs that effect service times and accurately predict, prioritize, update, and/or actively manage restaurant systems to better meet customer expectations (e.g., stored maximum service time thresholds). In some embodiments, revenue management variables may be included in the AI model to prioritize higher-value orders and/or geolocation data may be utilized to load balance orders (and/or order channels) between different food service establishments (e.g., different locations of a franchise). According to some embodiments, the AI model may be utilized to dynamically rearrange and/or schedule restaurant staff and/or devices, dynamically predict and/or manage ingredient inventory and/or cooking supplies, and/or dynamically throttle (e.g., turn-on, turn-off, or set one or more thresholds for) one or more ordering channels in an omnichannel ordering system.

Previous systems have generally been limited to estimating order times for a single ordering channel to set customer expectations, and have been based on data sources external to the kitchen. Such systems have, for example, attempted to estimate delivery times (i) based predominantly on delivery variables such as routes, traffic, weather conditions, and/or selected delivery entity or (ii) based on current or expected customer demand (e.g., utilizing computer-vision to analyze physical customer queues/traffic outside of a restaurant). Systems that take into account internal kitchen data have generally limited analysis and management to predicting a fulfillment time and/or have compared estimated order readiness times to expected customer arrival times for each individual order (e.g., from a single order channel) to set individual customer expectations.

In contrast, some embodiments herein provide an omnichannel AI model that is trained on and utilizes a combination of external and internal data to dynamically and/or automatically balance omnichannel ordering mechanisms and/or kitchen systems to provide enhanced efficiency, predictability, and customer satisfaction for a restaurant (or group of restaurants). The omnichannel AI model may, for example, set or adjust order, order channel, kitchen device, kitchen station (e.g., staffing), and/or menu item weighting and/or prioritization based on analysis of current omnichannel ordering data and having been trained on a data set of previous omnichannel ordering data that includes both internal and external data sources.

II. Omnichannel AI Restaurant Management Systems

Referring first to FIG. 1, a block diagram of a system 100 according to some embodiments is shown. In some embodiments, the system 100 may comprise a plurality of ordering devices 102a-n in communication via or with a network 104. According to some embodiments, the system 100 may comprise a third-party device 106, and/or a controller device 110, e.g., any or all of which may be in communication with or via the network 104. In some embodiments, any or all of the devices 102a-n, 106, 110 may comprise and/or be in communication with a database, data storage device, and/or memory device 140. According to some embodiments, communications between and/or within the devices 102a-n, 106, 110, 140 of the system 100 may be utilized to (i) receive (e.g., intercept and/or query) order data, (ii) transform order data, (iii) predict (e.g., utilizing an AI model) a fulfillment time for the order, (iv) transmit and/or forward the order data and/or the prediction of the fulfillment time for the order, (v) receive (e.g., intercept and/or query) kitchen data (e.g., from a kitchen device), (vi) update the fulfillment time for the order based on a changed status of the order, (vii) transmit and/or forward the updated prediction of the fulfillment time for the order, (viii) compute a throughput metric, (ix) determine whether to throttle and/or adjust at least one of an ordering channel and a kitchen device (e.g., based on stored rules and/or logic), (x) transmit a command to cause the ordering channel and/or kitchen device to be operated in accordance with a computed value (e.g., based on the throughput metric), (xi) retrieve historical order data, (xii) transform historical order data, and/or (xiii) update the AI model based on the historical order data.

Fewer or more components 102a-n, 104, 106, 110, 140 and/or various configurations of the depicted components 102a-n, 104, 106, 110, 140 may be included in the system 100 without deviating from the scope of embodiments described herein. In some embodiments, the components 102a-n, 104, 106, 110, 140 may be similar in configuration and/or functionality to similarly named and/or numbered components as described herein. In some embodiments, the system 100 (and/or portions thereof) may comprise an omnichannel AI restaurant management system and/or a platform programmed and/or otherwise configured to execute, conduct, and/or facilitate the methods/algorithms 400, 500, 800 of FIG. 4, FIG. 5A, FIG. 5B, and/or FIG. 8 herein, and/or portions or combinations thereof.

According to some embodiments, the ordering devices 102a-n may comprise any type or configuration of computing, mobile electronic, network, client, user, and/or communication devices that are or become known or practicable. The ordering devices 102a-n may, for example, comprise one or more Personal Computer (PC) devices, computer workstations, tablet computers, such as an iPad® manufactured by Apple®, Inc. of Cupertino, CA, and/or cellular and/or wireless telephones, such as an iPhone® (also manufactured by Apple®, Inc.) or an LG V50 THINQ™ 5G smart phone manufactured by LG® Electronics, Inc. of San Diego, CA, and running the Android® operating system from Google®, Inc. of Mountain View, CA. In some embodiments, the ordering devices 102a-n may comprise one or more devices owned and/or operated by one or more customers, potential customers, ordering entities or groups, and/or ordering service providers. According to some embodiments, the ordering devices 102a-n may communicate with the controller device 110 either directly or via the network 104 to automatically analyze orders, predict fulfillment times, and/or dynamically adjust or set ordering channel, kitchen device, and/or restaurant management parameters, in accordance with the omnichannel AI restaurant management concepts described herein.

The network 104 may, according to some embodiments, comprise a Local Area Network (LAN; wireless and/or wired), cellular telephone, Bluetooth®, Near Field Communication (NFC), and/or Radio Frequency (RF) network with communication links between the controller device 110, the ordering devices 102a-n, the third-party device 106, and/or the memory device 140. In some embodiments, the network 104 may comprise direct communication links between any or all of the components 102a-n, 106, 110, 140 of the system 100. The ordering devices 102a-n may, for example, be directly interfaced or connected to one or more of the controller device 110 and/or the third-party device 106 via one or more wires, cables, wireless links, and/or other network components, such network components (e.g., communication links) comprising portions of the network 104. In some embodiments, the network 104 may comprise one or many other links or network components other than those depicted in FIG. 1. The controller device 110 may, for example, be connected to one or more of the ordering devices 102a-n via various cell towers, routers, repeaters, ports, switches, and/or other network components that comprise the Internet and/or a cellular telephone (and/or Public Switched Telephone Network (PSTN)) network, and which comprise portions of the network 104.

While the network 104 is depicted in FIG. 1 as a single object, the network 104 may comprise any number, type, and/or configuration of networks that is or becomes known or practicable. According to some embodiments, the network 104 may comprise a conglomeration of different sub-networks and/or network components interconnected, directly or indirectly, by the components 102a-n, 106, 110, 140 of the system 100. The network 104 may comprise one or more cellular telephone networks with communication links between the ordering devices 102a-n and the controller device 110, for example, and/or may comprise an NFC or other short-range wireless communication path, with communication links between various ordering devices 102a-n, for example.

According to some embodiments, the third-party device 106 may comprise any type or configuration of a computerized processing device, such as a PC, laptop computer, computer server, database system, and/or other electronic device, devices, or any combination thereof. In some embodiments, the third-party device 106 may be owned and/or operated by a third party (i.e., an entity different than any entity owning and/or operating either the ordering devices 102*a-n* or the controller device 110; such as a payment processing, communications, certificate, authentication, data storage, demographic, graphical element, and/or cryptographic service provider). The third-party device 106 may comprise, for example, a server via which cloud-based services, such as virtual Point-Of-Sale (POS) services, are provided to the controller device 110 and/or the ordering devices 102*a-n*. According to some embodiments, the third-party device 106 may comprise a plurality of devices (e.g., sensors and/or computing devices) and/or may be associated with a plurality of third-party entities. In some embodiments, the third-party device 106 may comprise the memory device 140 (or a portion thereof), such as in the case the third-party device 106 comprises a third-party data storage service, device, and/or system, such as the Amazon® Simple Storage Service (Amazon® S3™) available from Amazon.com, Inc. of Seattle, WA or an open-source third-party database service, such as MongoDB™ available from MongoDB, Inc. of New York, NY.

In some embodiments, the controller device 110 may comprise an electronic and/or computerized controller device, such as a computer server and/or server cluster communicatively coupled to interface with the ordering devices 102*a-n* and/or the third-party device 106 (directly and/or indirectly). The controller device 110 may, for example, comprise one or more PowerEdge™ M910 blade servers manufactured by Dell®, Inc. of Round Rock, TX, which may include one or more Eight-Core Intel® Xeon® 7500 Series electronic processing devices. According to some embodiments, the controller device 110 may be located remotely from one or more of the ordering devices 102*a-n* and/or the third-party device 106. The controller device 110 may also or alternatively comprise a plurality of electronic processing devices located at one or more various sites and/or locations (e.g., a distributed computing and/or processing network, e.g., at different physical locations of a restaurant chain, franchise, etc.).

According to some embodiments, the controller device 110 may store and/or execute specially programmed instructions (not separately shown in FIG. 1) to operate in accordance with embodiments described herein. The controller device 110 may, for example, execute one or more programs, modules, and/or routines that automatically analyze, e.g., utilizing at least one trained AI (and/or Machine Learning (ML)) model, orders (current and/or historic) to dynamically control and/or configure one or more restaurant devices, systems, etc., as described herein. According to some embodiments, the controller device 110 may execute stored instructions, logic, and/or software modules to (i) receive (e.g., intercept and/or query) order data, (ii) transform order data, (iii) predict (e.g., utilizing an AI model) a fulfillment time for the order, (iv) transmit and/or forward the order data and/or the prediction of the fulfillment time for the order, (v) receive (e.g., intercept and/or query) kitchen data (e.g., from a kitchen device), (vi) update the fulfillment time for the order based on a changed status of the order, (vii) transmit and/or forward the updated prediction of the fulfillment time for the order, (viii) compute a throughput metric, (ix) determine whether to throttle and/or adjust at least one of an ordering channel and a kitchen device (e.g., based on stored rules and/or logic), (x) transmit a command to cause the ordering channel and/or kitchen device to be operated in accordance with a computed value (e.g., based on the throughput metric), (xi) retrieve historical order data, (xii) transform historical order data, and/or (xiii) update the AI model based on the historical order data.

In some embodiments, the ordering devices 102*a-n*, the third-party device 106, and/or the controller device 110 may be in communication with and/or comprise the memory device 140. The memory device 140 may comprise, for example, various databases and/or data storage mediums that may store, for example, order data, kitchen device data, customer data, supply data (e.g., ingredient and/or other consumable stocks or supplies), sensor data, object data, classification rules, keyword identification rules, GUI element data, natural text/speech generation and/or transcription data, Optical Character Recognition (OCR) rules and/or data, AI intent data, AI order state data, cryptographic keys and/or data, login and/or identity credentials, and/or instructions (e.g., omnichannel AI restaurant management training instructions) that cause various devices (e.g., the controller device 110, the third-party device 106, and/or the ordering devices 102*a-n*) to operate in accordance with embodiments described herein. The memory device 140 may store, for example, various omnichannel AI restaurant management training code and/or Kitchen Display System (KDS) device applications and/or interface generation instructions, each of which may, when executed, participate in and/or cause dynamic, AI-based restaurant management, as described herein. In some embodiments, the memory device 140 may comprise any type, configuration, and/or quantity of data storage devices that are or become known or practicable. The memory device 140 may, for example, comprise an array of optical and/or solid-state hard drives configured to store text, array, matrix, structured, unstructured, and/or ASCII data (e.g., order data and/or kitchen data), digital image, audio, and/or video data, image, audio, and/or object analysis data, sensor data, and/or AI model data (e.g., analysis formulas and/or mathematical models), credentialing instructions and/or keys, and/or various operating instructions, drivers, etc. In some embodiments, the memory device 140 may comprise a solid-state and/or non-volatile memory card (e.g., a Secure Digital (SD) card, such as an SD Standard-Capacity (SDSC), an SD High-Capacity (SDHC), and/or an SD eXtended-Capacity (SDXC) and any various practicable form factors, such as original, mini, and micro sizes, available from Western Digital Corporation of San Jose, Calif. While the memory device 140 is depicted as a stand-alone component of the controller device 110, the memory device 140 may comprise multiple components. In some embodiments, a multi-component memory device 140 may be distributed across various devices and/or may comprise remotely dispersed components. Any or all of the ordering devices 102*a-n*, the third-party device 106, and/or the controller device 110 may comprise the memory device 140 or a portion thereof, for example Turning to FIG. 2, a block diagram of a system 200 according to some embodiments is shown. In some embodiments, the system 200 may comprise one or more customer devices 202*a-b* that may be utilized to generate, define, and/or provide one or more orders "A", "B", and/or "C" (e.g., requests for service) via a plurality of channels. The customer devices 202*a-b* may be in communication with a network 204, for example, and/or may be in communication with one or more restaurant devices 206 (such as a POS device 206*a*, a KDS device 206*b*, and/or kitchen devices 206*c*). In some embodiments, a first customer device 202*a* and/or the restaurant devices 206*a-c* may be disposed at a particular location (e.g., having unique geographical coordinates) such as a restaurant 208. The restaurant 208 may be connected to the network 204, for example, such that some orders ("A" and/or "B") are received via local or in-store channels and other orders ("B" and/or "C") are received via remote ordering channels. In some embodiments, a first order "A" may be received directly at the POS device 206a (e.g., from the first customer device 202a and/or directly from a first customer or customer service representative; the latter two of which are not shown) in communication with the KDS device 206b and/or the kitchen devices 206c in the restaurant 208. According to some embodiments, one or more controller devices such as computer servers 210a-c may be in communication (e.g., via the network 204) with the POS device 206a, the KDS device 206b, and/or the kitchen devices 206c. A first server or restaurant server 210a may be disposed in the restaurant 208 to coordinate the acquisition of the first order "A" via the POS device 206a and the fulfillment of the first order "A" by sending one or more signals to the KDS device 206b and/or the kitchen devices 206c (e.g., in response to the receiving of the first order "A"). In some embodiments, the POS device 206a may be replaced or supplemented by a second server or "virtual POS" or cloud-based POS server 210b via which a second order "B" may be received (e.g., from a second customer device 202b). According to some embodiments, a third order "C" may be received via a third server or an online ordering server 210c (e.g., from the second customer device 202b).

In some embodiments, data descriptive of the orders "A", "B", "C", customers (not shown), the restaurant 208, the POS device 206a, the KDS device 206b, the kitchen device (s) 206c, and/or the network 204 may be captured, measured, and/or stored in one or more databases 240a-b. The restaurant 208 may compromise a first database 240a in communication with the restaurant server 210a, for example, and/or a second database 240b may be remote from the restaurant 208 (e.g., a cloud-based data store). According to some embodiments, the system 200 may comprise an AI modelling system 250 in communication with one or more of the other devices 202a-b, 206a-c, 210a-c, 240a-b. The AI modelling system 250 may, for example, execute stored instructions (e.g., stored in the second database 240b) to model restaurant demand, throughput, capacity, etc. In some embodiments, the AI modelling system 250 may comprise an AI-based restaurant management system that leverages AI modeling to predict fulfillment times, throttle ordering channels, and/or automatically adjust systems and/or devices in response to AI analysis results.

Fewer or more components 202a-b, 204, 206a-c, 208, 210a-c, 240a-b, 250 and/or various configurations of the depicted components 202a-b, 204, 206a-c, 208, 210a-c, 240a-b, 250 may be included in the system 200 without deviating from the scope of embodiments described herein. In some embodiments, the components 202a-b, 204, 206a-c, 208, 210a-c, 240a-b, 250 may be similar in configuration and/or functionality to similarly named and/or numbered components as described herein. In some embodiments, the system 100 (and/or portion thereof) may comprise an omnichannel AI restaurant management program, system, and/or platform programmed and/or otherwise configured to execute, conduct, and/or facilitate the methods/algorithms 400, 500, 800 of FIG. 4, FIG. 5A, FIG. 5B, and/or FIG. 8 herein, and/or portions or combinations thereof.

The customer devices 202a-b, in some embodiments, may comprise any types or configurations of computing, mobile electronic, network, user, and/or communication devices that are or become known or practicable. The customer devices 202a-b may, for example, comprise one or more tablet computers, such as an iPad@ manufactured by Apple®, Inc. of Cupertino, CA, and/or cellular and/or wireless telephones or "smart" phones, such as an iPhone® (also manufactured by Apple®, Inc.) or an Optimus™ S smart phone manufactured by LG® Electronics, Inc. of San Diego, CA, and running the Android® operating system from Google®, Inc. of Mountain View, CA. According to some embodiments, the customer devices 202a-b may comprise any combination and/or configuration of electronic devices that store, receive, transmit, provide, and/or process data, such as one or more "smart" cards, RFID and/or NFC cards, chips, and/or other data storage and/or processing objects. In some embodiments, the customer devices 202a-b may be owned and/or operated by different users and/or classes or groups of users. Ownership and/or operation by one or more entities or groups may be signified and/or defined by different sets of login credentials, identifiers, etc. A first user or group may be privy to, own, be assigned, and/or utilize a first set of login credentials and/or a first identifier that grant access to a first set of access privileges, for example, while a second user or group may be privy to, own, be assigned, and/or utilize a second set of login credentials and/or a second identifier that grant access to a second set of access privileges.

According to some embodiments, the customer devices 202a-b may comprise devices owned and/or operated by one or more customers, potential customers, and/or consumers that, e.g., each utilize a unique consumer login identifier and/or consumer login credentials. In some embodiments, the customer devices 202a-b may comprise devices owned and/or operated by one or more agents, representatives, brokers, third-parties, and/or other users that, e.g., each utilize a unique user login identifier and/or user login credentials. According to some embodiments, the customer devices 202a-b may communicate with the servers 210a-c (e.g., via the network 204) to provide, define, select, and/or transmit omnichannel food service orders (e.g., "A", "B", "C") to the restaurant 208.

The network 204 may, according to some embodiments, comprise a Local Area Network (LAN; wireless and/or wired), cellular telephone, Bluetooth® and/or BLE, NFC, and/or RF network with communication links between the servers 210a-c, the customer devices 202a-b, the restaurant devices 206a-c, the databases 240a-b, and/or the AI modelling system 250. In some embodiments, the network 204 may comprise direct communication links between any or all of the components 202a-b, 206a-c, 210a-c, 240a-b, 250 of the system 200. The customer devices 202a-b and/or restaurant devices 206a-c may, for example, be directly interfaced or connected to the restaurant server 210a (and/or the cloud-based POS server 210b, and/or the online ordering server 210c) via one or more wires, cables, wireless links, and/or other network components, such network components (e.g., communication links) comprising portions of the network 204. In some embodiments, the network 204 may comprise one or many other links or network components other than those depicted in FIG. 2. The customer devices 202a-b may, for example, be connected to the online ordering server 210c via various cell towers, routers, repeaters, ports, switches, and/or other network components that comprise the Internet and/or a cellular telephone (and/or PSTN) network, and which comprise portions of the network 204.

Figure 2:
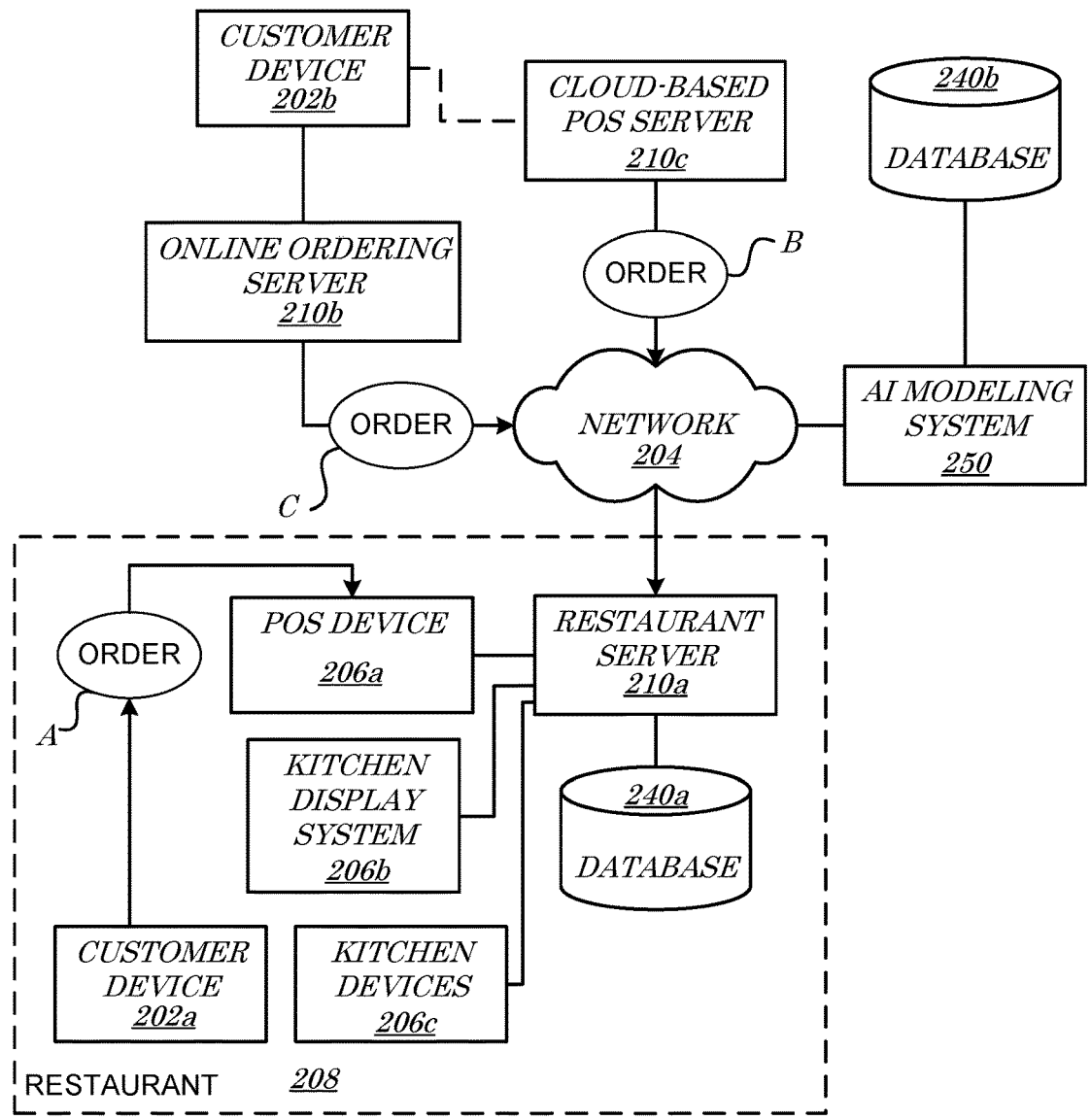
FIG. 2 is a block diagram of a system according to some embodiments.

While the network 204 is depicted in FIG. 2 as a single object, the network 204 may comprise any number, type, and/or configuration of networks that is or becomes known or practicable. According to some embodiments, the network 204 may comprise a conglomeration of different sub-networks and/or network components interconnected, directly or indirectly, by the components 202*a-b*, 206*a-c*, 210*a-c*, 240*a-b*, 250 of the system 200. The network 204 may comprise one or more cellular telephone networks with communication links between the customer devices 202*a-b* and the cloud-based POS server 210*b*, for example, and/or may comprise a BLE, NFC, RF, and/or a "personal" network comprising short-range wireless communications between the first customer device 202*a* and the POS device 206*a*, for example.

In some embodiments, the POS device 206*a* may comprise any type or configuration of POS device such as a Harbortouch® Onyx™ POS System available from Shift4 Payments, LLC of Allentown, PA, the KDS 206*b* may comprise any type or configuration of KDS such as a Square® KDS available from Square, Inc. of San Francisco, CA, and/or the kitchen devices 206*c* may include, but are not limited to, ovens, stoves, warmers, frying devices, microwave devices, freezers, coolers, conveyer belts, beverage dispensers, mixers, cooktops, etc.

According to some embodiments, any or all of the servers 210*a-c* may comprise any electronic and/or computerized controller devices, such as a computer server, communicatively coupled to interface with the customer devices 202*a-b*, the restaurant devices 206*a-c*, and/or the AI modelling system 250 (directly and/or indirectly). The servers 210*a-c* may, for example, comprise one or more PowerEdge™ R830 rack servers manufactured by Dell®, Inc. of Round Rock, TX, which may include one or more Twelve-Core Intel® Xeon® E5-4640 v4 electronic processing devices. In some embodiments, the AI modelling system 250 may comprise any electronic and/or computerized controller device, such as a computer server, communicatively coupled to interface with the customer devices 202*a-b*, the restaurant devices 206*a-c*, and/or the servers 210*a-c* (directly and/or indirectly). The AI modelling system 250 may, for example, comprise one or more PowerEdge™ R830 rack servers manufactured by Dell®, Inc. of Round Rock, TX, which may include one or more Twelve-Core Intel® Xeon® E5-4640 v4 electronic processing devices. In some embodiments, the AI modelling system 250 may comprise a plurality of processing devices specially programmed to execute and/or conduct processes that are not practicable without the aid of the AI modelling system 250. The AI modelling system 250 may, for example, provide AI analysis of restaurant data/inputs to generate and/or define accurate time of service (e.g., order fulfillment) estimates, automatically adjust kitchen settings, and/or prioritize orders (and/or order channels), as described herein. In some embodiments, such analysis would not be capable of being provided without the benefit of the specially programmed (e.g., trained and coded) AI modelling system 250. According to some embodiments, the AI modelling system 250 may be located remotely from one or more of the customer devices 202*a-n*, the restaurant devices 206*a-c* (and accordingly, the restaurant 208), and/or one or more of the servers 210*a-c*. The AI modelling system 250 may also or alternatively comprise a plurality of electronic processing devices located at one or more various sites and/or locations (e.g., at the restaurant 208 and/or remote therefrom).

According to some embodiments, the AI modelling system 250 may store and/or execute specially programmed instructions to operate in accordance with embodiments described herein. The AI modelling system 250 may, for example, execute one or more API, AI, ML, neural network, and/or other programs, modules, and/or routines that facilitate the definition of accurate time of service estimates, kitchen management settings, and/or order prioritization in an omnichannel order environment, as described herein.

In some embodiments, the servers 210*a-c* (and/or the customer devices 202*a-b*, restaurant devices 206*a-c*) and/or the AI modelling system 250 may be in communication with the databases 240*a-b*. The databases 240*a-b* may store, for example, user and/or account identification data, security data (e.g., login credentialing and/or decryption data), blockchain data (chaincode and/or blockchain ledger data), preference and/or characteristics data, consumer profile data, permissions data, external application data (e.g., external application instructions, addresses, and/or payment information), food service ordering data (e.g., a selection of one or more menu items, listing of ingredients and/or supplies for one or more items, etc.), and/or instructions that cause various devices (e.g., the servers 210*a-c*, customer devices 202*a-b*, restaurant devices 206*a-c*, and/or the AI modelling system 250) to operate in accordance with embodiments described herein. The databases 240*a-b* may store, for example, inventory data, menu data, recipe/ingredient data, order data (current and/or historical), blockchain curator/notary data, chaincode, ledger data (e.g., storing various data related to user communications, relationships, and/or transactions), third-party application scripts, and/or decision-making data (e.g., thresholds and/or logic). In some embodiments, the databases 240*a-b* may comprise any type, configuration, and/or quantity of data storage devices that are or become known or practicable. The databases 240*a-b* may, for example, comprise an array of optical and/or solid-state hard drives configured to store menu item data provided by (and/or requested by) the customer devices 202*a-b* (e.g., defining the one or more of the orders "A", "B", and/or "C"), sensor data (e.g., data from one or more of the restaurant devices 206*a-c*), blockchain access data, and/or various operating instructions, drivers, etc. While the databases 240*a-b* are depicted as a stand-alone components of the system 200 in FIG. 2, the databases 240*a-b* may comprise multiple components. In some embodiments, a multi-component database 240*a-b* may be distributed across various devices and/or may comprise remotely dispersed components. Any or all of the customer devices 202*a-b*, restaurant devices 206*a-c*, servers 210*a-c*, and/or AI modelling system 250 may comprise the databases 240*a-b* or a portion thereof, for example.

Figure 3:
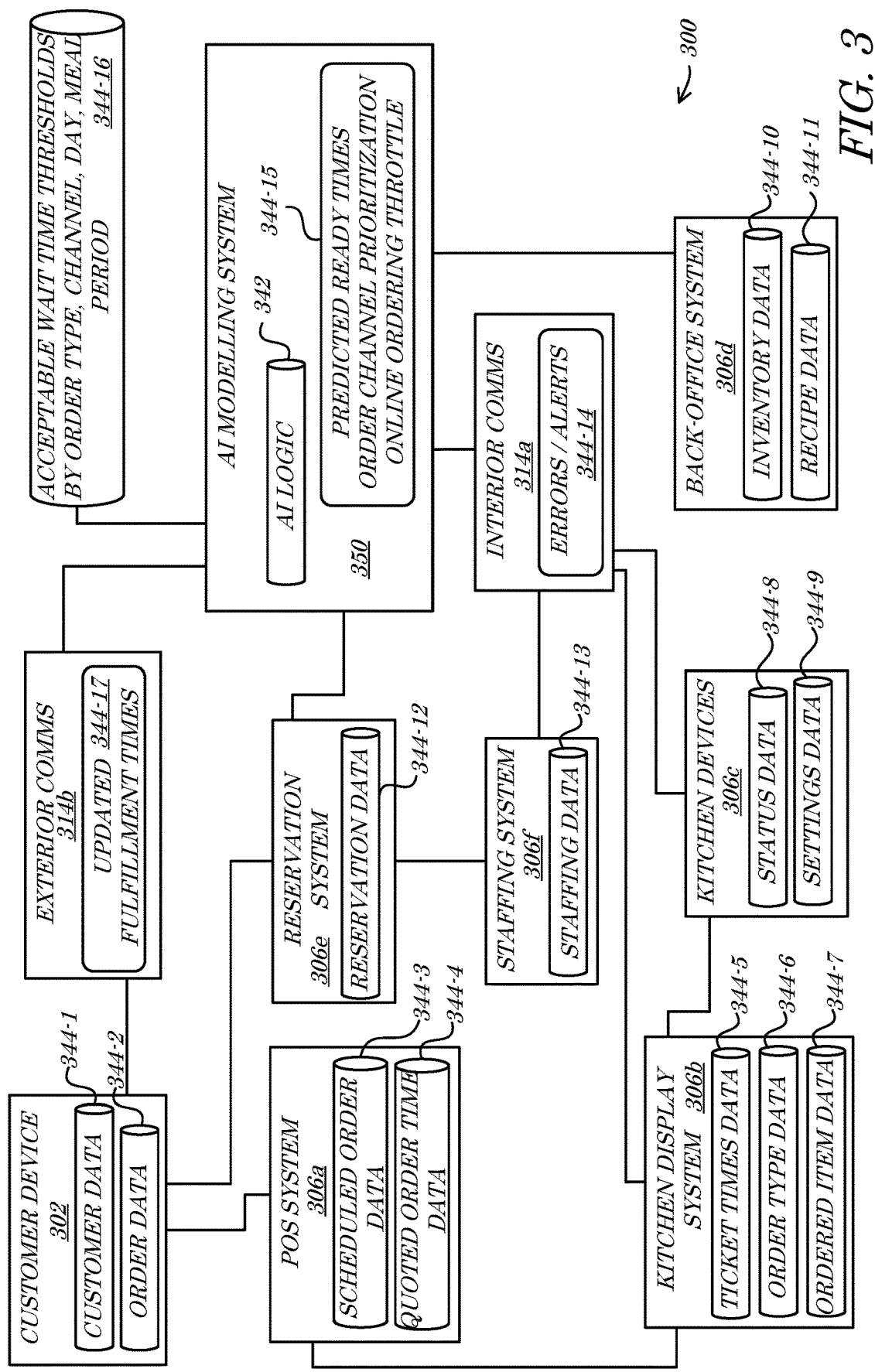
FIG. 3 is a block diagram of a system according to some embodiments.

Turning to FIG. 3, a block diagram of a system 300 according to some embodiments, is shown. In some embodiments, the system 300 may comprise a plurality of data sources or inputs such as a customer device 302 and/or one or more restaurant devices 306 such as a POS system 306*a*, a KDS 306*b*, kitchen devices 306*c*, a back-office system 306*d*, a reservation system 306*e*, and/or a staffing system 306*f*. According to some embodiments, any or all of the input devices 302, 306*a-f* may be in communication with each other either directly or through one or more communication devices 314 such as an interior communication ("comms") 314*a* and/or an exterior comms 314*b*. In some embodiments, AI logic 342 may utilize various data 344 as inputs and/or generate various data 344 as outputs. The customer device 302 may provide and/or define customer data 344-1 (e.g., customer account identifiers, financial account identifiers, demographics, geo-location data) and/or order data 344-2 (e.g., order history, order details, special order instructions, preferences, allergy data), for example, and/or the POS system 306*a* may provide and/or define scheduled order data 344-3 (e.g., pre-scheduled order data, current order data, order history and/or fulfillment data, payment data) and/or quoted order time data 344-4 (e.g., time until ready data, estimated ready time/date). In some embodiments, the KDS 306*b* may provide and/or define ticket times data 344-5 (number of current tickets, closed tickets, open tickets, problem tickets, actual ticket times), order type data 344-6 (menu item data, recipe data, special order instructions data, ingredient data), and/or ordered item data 344-7 (e.g., selected menu item data, quantity data, special instructions data). According to some embodiments, the kitchen device 306*c* may provide and/or define status data 344-8 (e.g., operational status such as on, off, ready, offline, filled, empty) and/or settings data 344-9 (e.g., temperature settings, time settings, power settings). In some embodiments, the back-office system 306*d* may provide and/or define inventory data 344-10 (e.g., ingredient inventory data, supplies inventory data) and/or recipe data 344-11 (e.g., quantity and type of ingredients needed for each menu item), for example, and/or the reservation system 306*e* may provide and/or define reservation data 344-12 (e.g., current and/or scheduled dine-in seating numbers). According to some embodiments, the staffing system 306*f* may provide and/or define staffing data 344-13 (e.g., scheduled staffing times, shift lengths, staff skill data, experience data, training data, performance data). In some embodiments, the AI logic 342 may provide and/or define errors/alerts 344-14 (e.g., output via the interior comms 314*a*), predicted ready times, order channel prioritization, and/or online ordering throttle data 344-15, acceptable wait time thresholds (e.g., by order type, channel, day, meal period, etc.) 344-16, and/or updated fulfillment times 344-17 (e.g., via the exterior comms 314*b*).

According to some embodiments, the AI logic 342 may be defined and/or executed by the AI modelling system 350 that may be in communication with the comms 314*a-b* and/or directly with any or all of the input devices 302, 306*a-b*. While the customer device 302 and the restaurant devices 306*a-f* are generally referred to as "input devices", they are not limited to providing inputs. The reference is made with respect to the "inputs" provided to the AI modelling system 350 to process methods in accordance with embodiments described herein. The customer device 302 may comprise a smart phone that is operable to both provide input to the system 300 and provide output to an associated customer (not shown), for example, and the KDS 306*b* may primarily function to provide order fulfillment data to restaurant staff (not shown) as output but may also provide AI modelling input to the AI modelling system 350.

In some embodiments, the AI logic 342 may comprise an ML algorithm that is trained on a set of the data 344 to develop a multivariate model for predicting order fulfillment times for an omnichannel ordering system (e.g., the system 300). The AI modelling system 350 may utilize the AI logic 342 to provide initial fulfillment times and/or data to the customer device 302 and/or may utilize real time data 344 to update and/or adjust previously-calculated fulfillment times. In some embodiments, the AI modelling system 350 may compare calculated and/or computed fulfillment times to stored business rules and/or thresholds (e.g., the thresholds 344-16) to determine whether restaurant operation rules are satisfied. According to some embodiments, such as in the case that one or more restaurant rules are determined not to be satisfied (e.g., one or more thresholds or other criteria are not met or are exceeded) the AI modelling system 350 may alter one or more restaurant operation parameters to adjust restaurant performance. The AI modelling system 350 may communicate with the staffing system 306*f* to adjust staffing levels (e.g., current or scheduled), for example, may automatically adjust settings data 344-9 of one or more kitchen devices 306*c* such as changing the temperature of a warming light or adjusting the speed of a conveyor belt, and/or may reconfigure the POS system 306*a* such as to throttle (e.g., limit or slow down) one or more ordering channels and/or to prioritize certain order channels, types, etc. In some embodiments, as restaurant parameters change, the AI modelling system 350 may automatically compute and communicate the updated fulfillment times 344-17 to the customer device 302 (e.g., via e-mail, text message, etc.) to adjust customer expectations (e.g., thereby reducing the likely level of unhappiness of customers).

Fewer or more components 302, 306*a-f*, 314*a-b*, 342, 344-1, 344-2, 344-3, 344-4, 344-5, 344-6, 344-7, 344-8, 344-9, 344-10, 344-11, 344-12, 344-13, 344-14, 344-15, 344-16, 344-17 and/or various configurations of the depicted components 302, 306*a-f*, 314*a-b*, 342, 344-1, 344-2, 344-3, 344-4, 344-5, 344-6, 344-7, 344-8, 344-9, 344-10, 344-11, 344-12, 344-13, 344-14, 344-15, 344-16, 344-17 may be included in the system 200 without deviating from the scope of embodiments described herein. In some embodiments, the components 302, 306*a-f*, 314*a-b*, 342, 344-1, 344-2, 344-3, 344-4, 344-5, 344-6, 344-7, 344-8, 344-9, 344-10, 344-11, 344-12, 344-13, 344-14, 344-15, 344-16, 344-17 may be similar in configuration and/or functionality to similarly named and/or numbered components as described herein. In some embodiments, the system 200 (and/or portion thereof) may comprise an omnichannel AI restaurant management program, system, and/or platform programmed and/or otherwise configured to execute, conduct, and/or facilitate the methods/algorithms 400, 500, 800 of FIG. 4, FIG. 5A, FIG. 5B, and/or FIG. 8 herein, and/or portions or combinations thereof.

III. Omnichannel AI Restaurant Management Processes

Figure 4:
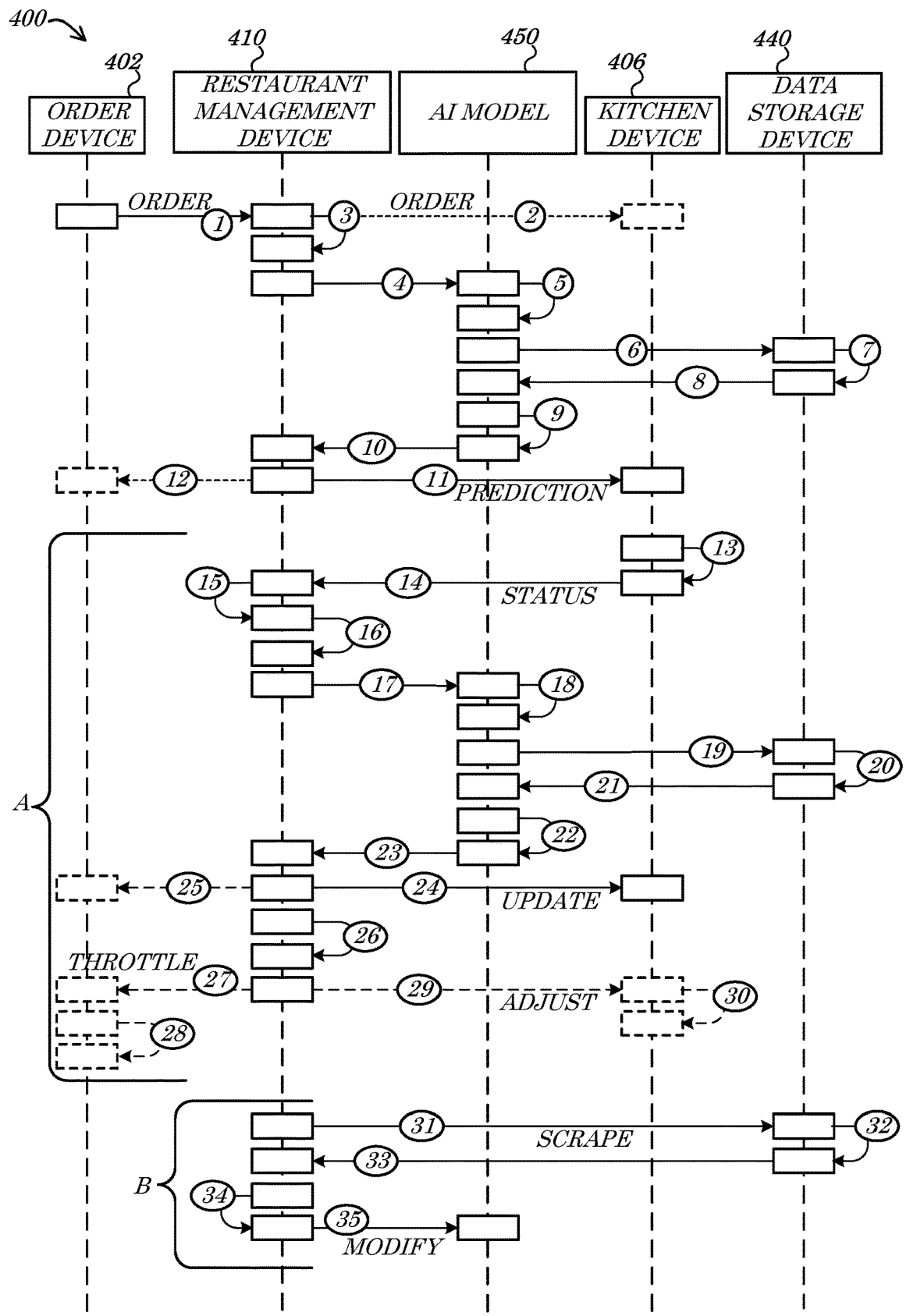
FIG. 4 is a systemic flow diagram of a process or method according to some embodiments.

Referring now to FIG. 4, a systemic flow diagram of a process or method 400 according to some embodiments, is shown. The method 400 may, for example, be executed by various hardware and/or logical components via interactive communications, involving communications between one or more order devices 402, one or more kitchen devices 406, a restaurant management system or device 410, one or more data storage devices 440, and/or an AI model 450. While not explicitly depicted in FIG. 4, the devices 402, 406, 410, 440, 450 may be in communication via various networks and/or network components, and/or may process received data by executing instructions via one or more electronic processing devices. In some embodiments, the order device 402 may comprise and/or represent a device that originates and/or inputs orders via one particular ordering channel of a plurality of available ordering channels. According to some embodiments, the kitchen device 406 may comprise and/or represent one or more of a plurality of different restaurant and/or kitchen-related systems and/or devices as described herein, e.g., including, but not limited to, a restaurant reservation system, a restaurant online ordering system, an in-restaurant POS and/or ordering system, a restaurant staffing system, and/or one or more in-kitchen devices such as stoves, grills, ovens, etc. In some embodiments, the data storage device 440 may comprise and/or represent a plurality of data storage and/or memory devices such as, but not limited to, a cloud-based data storage service, a third-party data provider device, and/or an in-restaurant data storage device/database.

The process diagrams and flow diagrams described herein do not necessarily imply a fixed order to any depicted actions, steps, and/or procedures, and embodiments may generally be performed in any order that is practicable unless otherwise and specifically noted. While the order of actions, steps, and/or procedures described herein is generally not fixed, in some embodiments, actions, steps, and/or procedures may be specifically performed in the order listed, depicted, and/or described and/or may be performed in response to any previously listed, depicted, and/or described action, step, and/or procedure. Any of the processes and methods described herein may be performed and/or facilitated by hardware, software (including microcode), firmware, or any combination thereof. For example, a storage medium (e.g., a hard disk, RAM device, cache memory device, Universal Serial Bus (USB) mass storage device, and/or Digital Video Disk (DVD); e.g., the data storage device 440 and/or the databases 140, 240*a-b*, 640, 740*a-e* of FIG. 1, FIG. 2, FIG. 6, FIG. 7A, FIG. 7B, FIG. 7C, FIG. 7D, and/or FIG. 7E herein) may store thereon instructions that when executed by a machine (such as a computerized processor) result in performance according to any one or more of the embodiments described herein.

In some embodiments, the method 400 (e.g., for omnichannel AI restaurant management) may begin at "1" with a transmitting of an order (e.g., for a service and/or product, such as for one or more menu items at a restaurant) or request by the order device 402. In some embodiments, the order or transmitting at "1" may comprise a transmission of data descriptive of one or more desired services and/or products to the restaurant management device 410 (and accordingly the receipt of the information thereof). In some embodiments, the restaurant management device 410 may forward and/or transmit an indication of the order to the kitchen device 406, at "2". The transmitting at "2" may, in some embodiments, result from an automatic activation of a hard-coded network address or remote identifier of the kitchen device 406 embedded within and/or accessible to application instructions executed by the restaurant management device 410. In some embodiments, the order transmitted at "1" may be sent from the order device 402 to the kitchen device 406 at "2", and may be intercepted and/or "listened" to by the restaurant management device 410. According to some embodiments, the restaurant management device 410 may intercept the transmission of the order that would otherwise have been sent to the kitchen device 406 at "2" and may process the order data before passing the intercepted order (and/or a portion or appended order data) on to the kitchen device 406 later in the method 400.

According to some embodiments, the restaurant management device 410 may process the order data at "3" utilizing stored data processing instructions that may, for example, transform and/or map the order data into one or more different formats, files, data tables, matrices, etc. The restaurant management device 410 may, in response to the receiving/intercepting of the order transmitted at "1", for example, parse the order data and extract and/or map certain data elements within the order data to one or more predefined data fields and/or parameters. According to some embodiments, the restaurant management device 410 may, upon receiving, storing, and/or processing the order data and/or in response to the receiving/intercepting of the order, call, initiate, and/or invoke the AI model 450 by sending a command and/or request for analysis of the order data, at "4". In some embodiments, the command and/or request may comprise the order data and/or a portion thereof (e.g., an indication thereof) and/or may comprise an indication of the processed and/or transformed data and/or portions thereof.

According to some embodiments, the AI model 450 may, utilizing and/or employing specially-coded logic developed from a training data set, utilize the data received at "4" to generate and/or define a query at "5". The query may, for example, identify and/or define certain query parameters that are derived and/or computed based on the order data. In some embodiment, the AI model 450 may transmit the query (and/or an indication thereof) to the data storage device 440, at "6". The data storage device 440 may, in response to receiving the query for example, utilize the query data (e.g., order data) to locate and/or identify stored data corresponding to the query parameters, at "7". In some embodiments, the data storage device 440 may transmit the identified and/or located stored data as a query result to the AI model 450 (e.g., which may accordingly receive the query result), at "8". According to some embodiments, the AI model 450 may utilize the query result and/or the order data to derive, calculate, and/or compute a predicted fulfillment time (e.g., for the order), at "9". In some embodiments, the predicted fulfilment time may be transmitted (e.g., as a "prediction") by the AI model 450 to the restaurant management device 410, e.g., as a response to the calling and/or initiating of the AI model 450, at "10". According to some embodiments, in response to the receiving of the prediction/response from the AI model 450, the restaurant management device 410 may publish, post, forward, and/or transmit the prediction to the kitchen device 406, at "11". According to some embodiments, the restaurant management device 410 may also or alternatively publish, post, forward, and/or transmit the prediction to the order device 402, at "12".

In some embodiments, the kitchen device 406 may receive and/or identify a status change and/or updated information regarding the preparation of the order (and/or regarding the restaurant's ability to process orders), at "13". The change/update information may be provided automatically by a component of the kitchen device 406, for example, and/or may be defined (at least in part) by input provided by a restaurant employee (not shown). An employee may, for example, activate an interface button (e.g., a "bump" bar, button, and/or switch) to indicate that a particular ingredient, menu item, packaging element, etc., has been prepared. In the case that the change indicates a readiness of an item, the data may indicate either a partial or full completion/readiness of the order (e.g., depending upon the contents/parameters of the order). According to some embodiments, the kitchen device 406 may transmit and/or provide (e.g., post and/or publish) the status, change, and/or update information such that the restaurant management device 410 receives the information, at "14". In some embodiments, the restaurant management device 410 may transform and/or process the data from the kitchen device 406, at "15". The restaurant management device 410 may, for example, decode, parse, convert, and/or otherwise process the data to define updated order information. According to some embodiments, the restaurant management device 410 may invoke, execute, and/or apply stored instructions, rules, and/or logic to determine whether the updated order information is likely to affect the original prediction, at "16". In the case that no change is computed to be expected (e.g., by applying statistical analysis and/or comparing the data to stored thresholds and/or rules), the method 400 may end and/or may take no action in response to the receiving of the updated order data. In the case that the change is computed to be likely to affect the prediction, the restaurant management device 410 may trigger a call and/or execution of the AI model 450, at "17". The restaurant management device 410 may, for example, pass some or all of the updated order data to the AI model 450 to request a re-computation of the predicted fulfillment time.

According to some embodiments, the AI model 450 may, utilizing and/or employing the specially-coded logic developed from the training data set, utilize the data (e.g., updated order data, restaurant status data) received at "17" to generate and/or define a query at "18". The query may, for example, identify and/or define certain query parameters that are derived and/or computed based on the updated order and/or restaurant data. In some embodiment, the AI model 450 may transmit the query (and/or an indication thereof) to the data storage device 440, at "19". The data storage device 440 may, in response to receiving the query for example, utilize the query data (e.g., updated order/restaurant data) to locate and/or identify stored data corresponding to the query parameters, at "20". In some embodiments, the data storage device 440 may transmit the identified and/or located stored data as a query result to the AI model 450 (e.g., which may accordingly receive the query result), at "21". According to some embodiments, the AI model 450 may utilize the query result and/or the updated order/restaurant data to derive, calculate, and/or compute an updated predicted fulfillment time (e.g., for the order), at "22". In some embodiments, the updated predicted fulfilment time may be transmitted (e.g., as an "updated prediction") by the AI model 450 to the restaurant management device 410, e.g., as a response to the calling and/or initiating of the AI model 450, at "23". According to some embodiments, in response to the receiving of the updated prediction/response from the AI model 450, the restaurant management device 410 may publish, post, forward, and/or transmit the updated prediction to the kitchen device 406, at "24". According to some embodiments, the restaurant management device 410 may also or alternatively publish, post, forward, and/or transmit the updated prediction to the order device 402, at "25".

In some embodiments, the restaurant management device 410 may process data descriptive of the order, the prediction, the updated order/restaurant data, and/or the updated prediction, e.g., by application of stored rules and/or logic to determine whether a remediation and/or response action should be initiated (e.g., based on computation of a throughput metric), at "26". The restaurant management device 410 may determine, for example, that a remediation and/or response action is warranted, such as, but not limited to, adjusting (e.g., turning-on, turning-off, throttling, prioritizing, limiting, etc.) one or more ordering channel settings and/or adjusting a parameter and/or setting of the kitchen device 406. As shown for exemplary purposes in FIG. 4, the restaurant management device 410 may, for example, transmit a command (and/or an alert) to the order device 402 requesting and/or causing an adjustment of an ordering channel setting, at "27". In some embodiments, the transmitted command, data, and/or request may be implemented and/or responded to by an adjustment being made to the ordering channel and/or order device 402, at "28". The order device 402 may, for example, such as in the case that the order device 402 comprises a device via which orders from a particular ordering channel are defined and/or received, modify a setting to: (i) stop (or start) orders from being placed via the specific ordering channel, (ii) limit (or increase) the number and/or rate of orders placed via the specific ordering channel, (iii) adjust a weight and/or prioritization setting for the specific ordering channel, and/or (iv) modify a setting defining and/or limiting the types of orders submitted and/or defined by the specific ordering channel (e.g., limit new orders to orders placed from within a particular geographic distance, limit new orders to certain types and/or groups of customers (e.g., members, high-value customers), require new orders to have a total value over a threshold amount, require new orders to include a fee, limit new orders to certain menu items, etc.).

According to some embodiments, and also as shown for exemplary purposes in FIG. 4, the restaurant management device 410 may also or alternatively, for example, transmit a command (and/or an alert) to the kitchen device 406 requesting and/or causing an adjustment of a kitchen device and/or restaurant setting, at "29". In some embodiments, the transmitted command, data, and/or request may be implemented and/or responded to by an adjustment being made to the kitchen device 406 (and/or to another device and/or system of the restaurant), at "30". The kitchen device 402 may, for example, change a temperature of a warming and/or cooking device, automatically re-order an inventory item, update and/or change staffing schedules and/or duties/assignments, dynamically modify workflow procedures, etc. According to some embodiments, portions of the method 400 such as a first portion "A" may be repeated automatically, e.g., at intervals of time and/or in response to triggering events. The portions of the method 400 from "13" through "30", for example, may be initiated and/or executed by a "bot", loop, and/or other program that continually updates a status for, checks a status of, and/or evaluates one or more conditions for the order(s). The first portion "A" may be repeated, triggered, and/or updated, for example, repeatedly between the opening and closing of any particular order.

In some embodiments, the method 400 may comprise the restaurant management device 410 periodically identifying, pulling, downloading, and/or scraping data. The restaurant management device 410 may, for example, structure and send a query to the data storage device 440, requesting restaurant and/or order data for a particular period of time, at "31". The data storage device 440 may, in response to receiving the query for example, utilize the query data (e.g., time period, restaurant identifier, and/or other filters and/or parameter values) to locate and/or identify stored data corresponding to the query parameters, at "32". In some embodiments, the data storage device 440 may transmit the identified and/or located stored data as a query result to the restaurant management device 410 (e.g., which may accordingly receive the query result), at "33". In some embodiments, the restaurant management device 410 may process the query result to create and/or populate a plurality of data fields, tables, and/or elements. In a non-limiting example, the restaurant management device 410 may query for (and receive in return) all order data for the last twenty-four (24) hours, or previous business day and may receive one or more data files containing the queried data. In some embodiments, the restaurant management device 410 may process the received files/data, e.g., by application of stored rules and/or logic to determine whether metrics computed with respect to the data fall within desired and/or accepted levels (e.g., have values that are within predetermined ranges), at "34". The restaurant management device 410 may determine, for example, that the predictions, updated predictions, order channel settings, and/or kitchen device/system settings for the previous day (e.g., the queried time period) resulted in one or more parameters being outside of a predetermined range. In a case where a computed throughput metric such as number of fulfilled orders per hour is determined to be below a target minimum threshold, for example, the restaurant management device 410 may determine (e.g., based on application of the stored rules) that the AI model 450 should be updated and/or modified. According to some embodiments, the restaurant management device 410 may transmit a command and/or data that cause the AI model 450 to be modified, adjusted, and/or otherwise changed, e.g., based on the analysis of the queried data, at "35".

According to some embodiments, portions of the method 400 such as a second portion "B" may be repeated automatically, e.g., at intervals of time and/or in response to triggering events. The portions of the method 400 from "31" through "35", for example, may be initiated and/or executed by a "bot", loop, and/or other program that continually evaluates, reevaluates, and/or analyzes one or more conditions for the order(s), the restaurant(s), and/or the AI model 450. The second portion "B" may be repeated, triggered, and/or updated, for example, repeatedly each night (e.g., after the close of business for the workday), for each restaurant, chain, franchise, region, etc.

While many specific actions and components of the method 400 have been described with respect to FIG. 4, fewer or more actions, transmissions, and/or processing procedures may be implemented in the method 400 without deviating from embodiments herein. According to some embodiments, any transmission sent from an origin to a destination may be received by and/or at the destination, e.g., in response to the transmission. In some embodiments, fewer or more components 402, 406, 410, 440, 450 and/or various configurations of the depicted components 402, 406, 410, 440, 450 may be included in the method 400 without deviating from the scope of embodiments described herein. In some embodiments, the components 402, 406, 410, 440, 450 may be similar in configuration and/or functionality to similarly named and/or numbered components as described herein. In some embodiments, the method 400 (and/or one or more portions thereof) may comprise an omnichannel AI restaurant management program, system, and/or platform programmed and/or otherwise configured to execute, conduct, and/or facilitate the methods and/or algorithms 500, 800 of FIG. 5A, FIG. 5B, and/or FIG. 8 herein, and/or portions or combinations thereof.

Figure 5A:
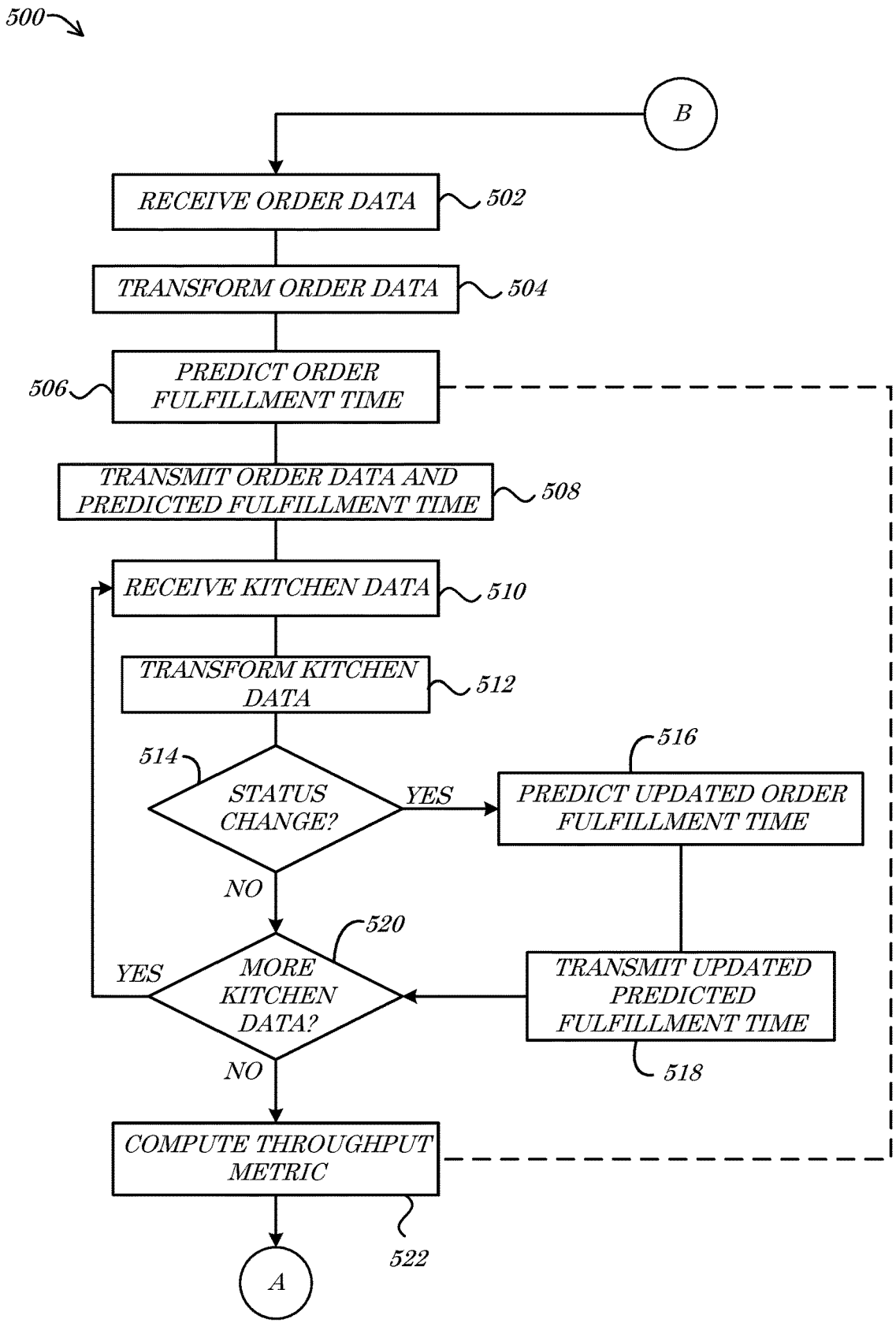
FIG. 5A and FIG. 5B are flow diagrams of a method according to some embodiments.
Figure 5B:
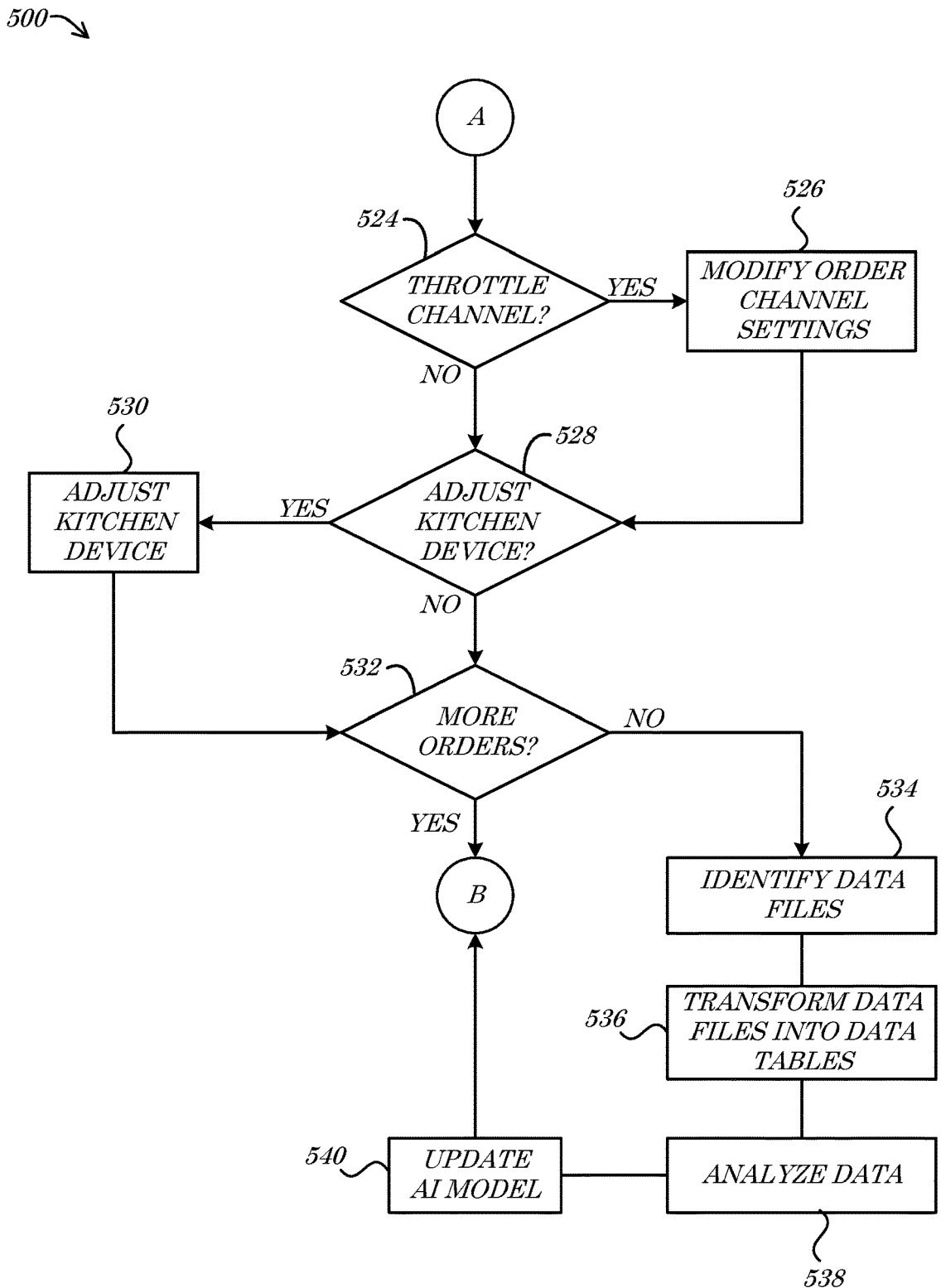

Referring now to FIG. 5A and FIG. 5B, flow diagrams of a method 500 according to some embodiments are shown. In some embodiments, the method 500 may be performed and/or implemented by and/or otherwise associated with one or more specialized and/or specially-programmed computers (e.g., the ordering/customer devices 102*a-n*, 202*a-b*, 302, 402, the third-party and/or kitchen devices 106, 206*a-c*, 306*a-f*, 406 and/or the server/controller devices, and/or apparatus 110, 210*a-c*, 410, 610, all of FIG. 1, FIG. 2, FIG. 3, FIG. 4, and/or FIG. 6 herein), computer terminals, computer servers, computer systems and/or networks, and/or any combinations thereof (e.g., by one or more multi-threaded and/or multi-core processing units of an omnichannel AI restaurant management system). In some embodiments, the method 500 may be embodied in, facilitated by, and/or otherwise associated with various input mechanisms and/or interfaces (e.g., the interface 620 of FIG. FIG. 6 herein).

In some embodiments, and with reference to FIG. 5A, the method 500 may initiate at, start, continue, and/or comprise receiving (e.g., by an electronic processing device and/or via an electronic communications network) order data, at 502. In the case that omnichannel AI restaurant management is conducted at least in part by a system and/or service operating separately and/or remotely from a restaurant, for example, the order data may be intercepted, queried, "listened" for, and/or otherwise acquired from one or more kitchen systems and/or devices of the restaurant. The omnichannel AI restaurant management system may, in some embodiments, comprise a listener that monitors an order and/or events queue of a restaurant system, for example. According to some embodiments, the omnichannel AI restaurant management may also or alternatively acquired and/or receive order data directly from one or more ordering channels such as from various in-person, remote, online, cloud-based, and/or hybrid ordering channel devices. In some embodiments, the order data may comprise any data descriptive of one or more orders. The order data may comprise, for example, data descriptive of and/or defining: (i) one or more ordered items, (ii) customer identification (and/or loyalty) data, (iii) customer geographic positioning data, (iv) payment data, (v) account data, (vi) login credentials, (vii) current and/or forecasted weather data, (viii) current and/or forecasted network data, (ix) ordering channel data (type, rules, volume, cost, etc.), etc.

According to some embodiments, the method 500 may comprise transforming (e.g., by the electronic processing device) the order data, at 504. The order data may be received in a first format, for example, and in some embodiments may be converted, decoded, and/or mapped to a second format, syntax, and/or data structure. In some embodiments, the transforming may comprise one or more alternative and/or additional data processing processes such as, but not limited to, decompressing, parsing, and/or utilizing the data (or portions thereof) to structure one or more queries that are utilized to identify and/or acquire data that is related to the received data.

In some embodiments, the method 500 may comprise predicting (e.g., by the electronic processing device, e.g., executing an omnichannel AI restaurant management model) an order fulfillment time, at 506. According to some embodiments, a first or initial call and/or initiation of the AI model may be conducted, e.g., in response to identifying the order data as being descriptive of a new order. The AI model may, for example, be trained, coded, and/or developed based on a training data set comprising a number of pre-selected variables, parameters, and/or data elements. According to some embodiments, the AI model may be trained utilizing and/or may operate upon inputs such as those listed in Table 1 below, comprising, but not limited to:

TABLE 1

| Data Input | Source |
| --- | --- |
| Order number | KDS, order device |
| Order Type | KDS, order device |
| Order Channel | KDS, order device, derived |
| Menu item | KDS, menu system |
| Ingredient | KDS, menu system |
| Recipe | KDS, menu system |
| Staff/personnel | Staffing system |
| Payment type | Payment processing system |
| Payment amount | Payment processing system, order device |
| Order price | Payment processing system, order device |
| Menu item price | KDS, order device, menu system |
| Menu item cost | KDS, menu system |
| Customer ID | KDS, order device, customer loyalty/account system |
| Group ID | KDS, order device, customer loyalty/account system |
| Customer loyalty no. | KDS, order device, customer loyalty/account system |
| Customer value | customer loyalty/account system |
| Customer location | order device, sensor |
| Network traffic | Network device |
| Network bandwidth | Network device |
| Current number of orders | KDS, order device |
| Prep station ID | KDS |
| Shift start time | Staffing system |
| Shift end time | Staffing system |
| Inventory item no. | KDS, inventory system |
| Inventory item count | KDS, inventory system |

TABLE 1-continued

| Data Input | Source |
| --- | --- |
| Order timestamp | KDS, order device, Payment processing system |
| Outside temperature | Weather system, sensor |
| Current weather type | Weather system, sensor |
| Time of day | KDS, order device, staffing system, native clock |
| Day of week | KDS, order device, staffing system, native clock |
| Cumulative order data (last 5 minutes, 10 minutes, 15 minutes, previous day, previous week, previous 2 weeks, etc.) | Derived |
| Preparation time (actual) | KDS |
| Relative preparation speed | Derived |

In some embodiments, the AI model may operate upon a plurality of inputs provided by and/or related to the order and compute a predicted fulfillment time (e.g., a first or "initial" prediction) by applying the logic derived from the training data set to current data associated with the order. According to some the AI model may return one or more other variable values, predictions, and/or data, e.g., in response to being called and/or invoked with respect to current order data. In some embodiments, the AI model may be trained and/or configured to perform a semantic analysis of some or all of the order data. The AI model may, for example, (i) cluster order data (e.g., for a plurality of orders) based on semantic similarities, (ii) identify a number of items in each order, and/or (iii) identify a number of modifiers in each order and/or ordered item. The AI model may, in some embodiments, apply and/or resolve one or more regression and/or decision tree algorithms to determine, compute, and/or calculate, for each order and based on the semantic cluster of the order, the number of items in the order, and/or the number of modifiers in the order, the predicted fulfilment time for the order. In such a manner, for example, fulfillment metrics for each possible ordered item, combination, etc. do not need to be discretely tracked and evaluated, e.g., to populate a table of average fulfillment times for different menu items. Instead, orders may be grouped and/or analyzed together based on semantic similarities (e.g., a first group that includes the word "burger" and a second group that includes an ingredient "salt"). Analysis of the different clusters and/or groups by the AI model may, in some embodiments, identify relationships that affect fulfillment time and may generate predictions based on such relationships (e.g., derived from historic and/or training data).

According to some embodiments, the method 500 may comprise transmitting (e.g., by the electronic processing device and/or via the electronic communications network) the order data and/or the predicted order fulfillment time, at 508. In the case that the order data is intercepted or otherwise passively acquired, the transmitting may only include the initial predication (and/or related data), as the kitchen/ordering system may already have access to the original order (e.g., as it came in/was generated). In the case that the raw order data is intercepted and/or diverted, the order data may be modified (e.g., via the transformation at 504) and/or appended (e.g., with the initial prediction and/or other AI model-sourced data) and then passed on to an original and/or ultimate destination such as an ordering system queue and/or kitchen system/device. According to some embodiments, the data may be transmitted to a hard-coded and/or predefined destination. In some embodiments, the data may be dynamically routed, e.g., based on the order channel type and/or other order and/or kitchen data variable values, to a selected one of a plurality of available destination addresses and/or devices.

In some embodiments, the method 500 may comprise receiving (e.g., by the electronic processing device and/or from a kitchen device) kitchen data, at 510. After the order has bee input, placed, initiated, and/or modeled (e.g., to generate the initial predication for the fulfillment time), for example, kitchen data may be automatically received from one or more kitchen systems and/or devices and/or may be actively acquired (e.g., by intermittent querying and/or polling). According to some embodiments, the kitchen data may be related to the order, such as an indication of which station an order is being prepared at, which staff is working on and/or assigned to the order, and/or what level and/or percent of completion the order is current at. In some embodiments, the data may be triggered to be sent to the AI restaurant management system/device automatically upon the occurrence of certain events in or outside of the restaurant (and may accordingly be automatically received in response to such triggering events).

According to some embodiments, the method 500 may comprise transforming (e.g., by the electronic processing device) the kitchen data, at 512. The AI restaurant management system may, for example, parse, decode, convert, map, and/or otherwise process the received kitchen data from one or more first formats, syntax, and/or structures into one or more second formats, syntax, and/or structures. In the case that the AI model is configured to receive certain types of variable inputs and/or data structures, for example, and as kitchen data may be received from a variety of kitchen devices of different manufacturers, models, and/or types, the data may be processed through one or more filters and/or conversion algorithms to place the data in a desired form for analysis and/or AI processing.

In some embodiments, the method 500 may comprise determining (e.g., by the electronic processing device) whether a status change has occurred, at 514. According to some embodiments, such as in the case that the data is received automatically in response to a trigger associated with the restaurant and/or the order (e.g., actively pushed from the restaurant systems), any received data may be automatically determined to be indicative of a status change for the order. In some embodiments, the received data may be processed by application of one or more stored rules to determine (i) whether the data is indicative of a status change and/or (ii) whether any indicated status change meets or exceeds a predetermined threshold. Certain intermediate statuses and/or data indicative of certain types of kitchen events may not be utilized, for example, as they may be predetermined to not have a substantive effect on order fulfillment times (e.g., certain received data may be filtered out and/or disregarded).

According to some embodiments, in the case that it is determined that a status change has occurred, the method 500 may comprise and/or proceed to predicting (e.g., by the electronic processing device, e.g., executing/re-executing the omnichannel AI restaurant management model) an updated order fulfillment time, at 516. The AI model may be called and/or initiated (e.g., for a second and/or subsequent time) in response to the received data and/or in response to the determination of the status change for the order/restaurant, for example. According to some embodiments, the AI model may process data indicative of the status change (e.g., some or all of the data received from the kitchen device(s)) to compute an updated predicted order fulfillment time (e.g., additional expected amount of time to completion and/or predicted time of day of completion). In the case that a difference between the original/first prediction and an updated/second prediction is below a predefined threshold, e.g., within ten (10) to thirty (30) seconds for example, the updated prediction may be simply equated to the original prediction and/or the AI model may return a "no change" result—e.g., to reduce processing in the case of insubstantial predictive changes. According to some embodiments, even changes amounting to as little as fractions of a second may be recorded and/or incorporated into and/or utilized to define the updated prediction. In some embodiments the AI model may dynamically adjust the thresholds for identifying and/or recording a separate and distinct updated prediction (e.g., based on network and/or restaurant data such as bandwidth, number of orders, rate of incoming orders, etc.).

In some embodiments, the method 500 may comprise transmitting (e.g., by the electronic processing device and/or via the electronic communications network) the updated predicted order fulfillment time, at 518. In the case that an updated/second prediction is computed by the AI model (e.g., as 516), for example, data descriptive of the updated/second prediction may be transmitted to the KDS and/or other restaurant systems and/or may be transmitted to a customer and/or ordering system. Due to the utilization of the AI model, data changes that would not typically be utilized in a rule-based system may be automatically identified and applied to predict fulfillment time changes, and the results of such otherwise unappreciated change-nodes may be utilized to better set customer expectations and/or to proactively modify restaurant settings to prevent degradation of service.

According to some embodiments, such as after the transmitting of the updated predicted order fulfillment time and/or in the case that it is determined that a status change has not occurred, the method 500 may comprise determining (e.g., by the electronic processing device) whether there is additional kitchen data, at 520. In some embodiments, for example, the method 500 may loop and/or repeat to constantly and/or intermittently (e.g., in real time) update order data and predictions for the order. According to some embodiments, such repeated reprocessing and/or analysis may be conducted until an order is closed/delivered. The method 500 may, for example, poll an order status flag and/or queue to identify whether the order is closed or not. According to some embodiments, in the case that it is determined that more kitchen data (e.g., updated/changed status, order, and/or restaurant data) exists and/or has not yet been received, the method 500 may comprise, repeat, and/or proceed back to receiving (e.g., by the electronic processing device and/or from the kitchen device) additional kitchen data, at 510. In the case that it is determined that all updated/changed kitchen data has been received (and/or identified), the method 500 may comprise and/or proceed to computing (e.g., by the electronic processing device) a throughput metric, at 522. In some embodiments, the throughput metric may comprise a matrix of values that are descriptive of one or more of (i) a current performance of the restaurant and/or (ii) a desired (e.g., within predefined ranges) performance of the restaurant. The metric may, in some embodiments, be computed by the AI model and/or by a second AI/ML algorithms (e.g., trained with a different set of training data).

The throughput metric may, for example, comprise a measure (quantitative and/or qualitative) of the performance of the fulfillment of the particular order and/or of the restaurant (and/or portions, systems, and/or devices thereof). In some embodiments, as indicated by the dotted line in FIG. 5A, the metric may be based upon the original/first order fulfillment data/prediction and/or may be calculated before the order is fulfilled (and/or before a new order is placed). The metric may also or alternatively be computed and/or updated after the order is fulfilled and/or after a threshold number of orders have been received and/or fulfilled. The metric may be computed and/or recomputed after fulfillment of every five (5) or ten (10) orders, for example, to derive and/or define a "health" metric for the order processing capability of the restaurant (and/or portions thereof). In some embodiments, the metric may take into account and/or represent or identify one or more out-of-bounds values for one or more parameters for the restaurant. The metric may indicate, for example, a staffing level that is too low or high (in general or for a particular station), an inventory level that is too low or high, a station that has statistically loner or shorter fulfillment performance with respect to other stations, etc.

In some embodiments, the method 500 may comprise and/or proceed to "A". With reference to FIG. 5B, for example, the method 500 may comprise and/or proceed from "A" to determining (e.g., by the electronic processing device) whether to adjust and/or set (e.g., "throttle") one of a plurality of order channels, at 524. The AI restaurant management system may, for example, utilize the throughput/health metric to determine whether changes should be made (e.g., in real time). In some embodiments, in the case that it is determined that a value of the metric falls outside of a predefined range of values, for example, it may be determined that the deviation is likely (e.g., statistically) to be a result of an imbalance and/or problem with one or more ordering channels.

In the case that it is determined that one or more order channels should be "throttled", the method 500 may comprise and/or proceed to modifying (or setting/defining; e.g., by the electronic processing device) an order channel setting, at 526. In the case that it is determined that the kitchen can't handle the current load of incoming orders (e.g., in general or for one or more specific ordering channels), for example, one or more ordering channels may be suspended, paused, turned-off, de-prioritized, and/or have access thereto limited/gated. Only orders of a certain type, size, price, cost, within or from a certain geographic area, originating from certain customers, customer groups, customer types, etc., may for example, be permitted, e.g., for any given ordering channel. Similarly, in the case that the analysis of the metric shows that order demand is lower than the current throughput capacity, ordering channels may be brought online, added, changed to be unconstrained, and/or actively incentivized/prioritized.

According to some embodiments, such as after the modifying of the order channel setting and/or in the case that it is determined that an order channel modification is not needed, the method 500 may comprise determining (e.g., by the electronic processing device) whether to adjust a setting for a kitchen system and/or device, at 528. Based on the throughput/health metric, for example, the AI restaurant management system may determine that one or more parameter values may be brought within acceptable ranges by adjusting the settings of the restaurant. In the case that it is determined that one or more kitchen devices, systems, and/or settings should be adjusted, the method 500 may comprise and/or proceed to adjusting (or setting/defining; e.g., by the electronic processing device) a kitchen device setting, at 530. The system may send an instruction and/or command to the restaurant and/or kitchen systems/devices, for example, causing a change in restaurant/kitchen operations. The system may, for example, suggest or cause a change in staffing, inventory, recipes and/or ingredients, order prioritization, temperature settings, etc. In the case that it is determined that one particular prep station is contributing most to fulfilment delays, for example, the system may send a signal that causes a staffing system to assign additional personnel to the station (and/or reassign personnel from another station), adjust shift schedules, and/or increase a temperature of an over, warmer, etc. (e.g., at the particular station and/or at an upstream station).

According to some embodiments, such as after the adjusting of the kitchen device setting and/or in the case that it is determined that a kitchen device setting modification is not needed, the method 500 may comprise determining (e.g., by the electronic processing device) whether there are more orders to analyze, at 532. Order channel and/or kitchen system/device adjustments may only be needed and/or processed, for example, during periods of incoming orders and/or during the work day (e.g., during business hours). In the case that it is determined that there are more orders to analyze the method 500 may comprise and/or proceed back to (e.g., loop) "B". The method 500 may proceed from "B", with reference back to FIG. 5A for example, to loop back to and/or repeat order processing by receiving additional order data, at 502.

In some embodiments, such as in the case that it is determined that there are no additional orders to process and/or analyze (e.g., at the end of the work day), the method 500 may comprise and/or proceed to identifying (e.g., by the electronic processing device) data files, at 534. After each word day, shift, and/or other desired time period, for example, the system may analyze larger volumes of data for a particular time period to identify more systemic issues for the restaurant. Data files descriptive of all orders, all orders of a certain type, and/or other portions of desired data may, in some embodiments, be pulled and/or downloaded from the restaurant system for analysis.

According to some embodiments, the method 500 may comprise and/or proceed to transforming (e.g., by the electronic processing device) the data files into data tables, at 536. The data files and/or the data therein may, for example, be acquired in a first format, syntax, and/or structure and may be transformed, converted, decoded, and/or otherwise processed into one or more second formats, syntax, and/or structures. In some embodiments, the elements from the data files may be mapped to specially-structured data tables that are arranged to felicitate analysis of certain restaurant metrics.

In some embodiments, the method 500 may comprise and/or proceed to analyzing (e.g., by the electronic processing device) the data in the data tables, at 538. The AI restaurant management system may, for example, execute one or more stored logical, mathematical, AI, ML, and/or other pre-programmed routines and/or algorithms to compute one or more metrics descriptive of the pulled/downloaded data set (e.g., for the desired timeframe). According to some embodiments, the method 500 may comprise and/or proceed to, e.g., after the analyzing of the data at 538, updating (e.g., by the electronic processing device) the AI model, at 540. In the case that it is determined from the computed metrics that the AI model has not adequately adjusted ordering channel and/or restaurant settings for the analyzed time period, for example, the system may retrain the AI model utilizing data from the analyzed time period, adjust weighting factors and/or model variable values, and/or otherwise modify the AI model based on the analyzed data.

In some embodiments, the method 500 may comprise and/or proceed or loop back to "B". The method 500 may proceed from "B", with reference back to FIG. 5A for example, to loop back to and/or repeat order processing by receiving additional order data, at 502, e.g., for the next business day and/or utilizing or employing the updated omnichannel AI restaurant management model.

IV. Apparatus, Articles of Manufacture, & Algorithms

Figure 6:
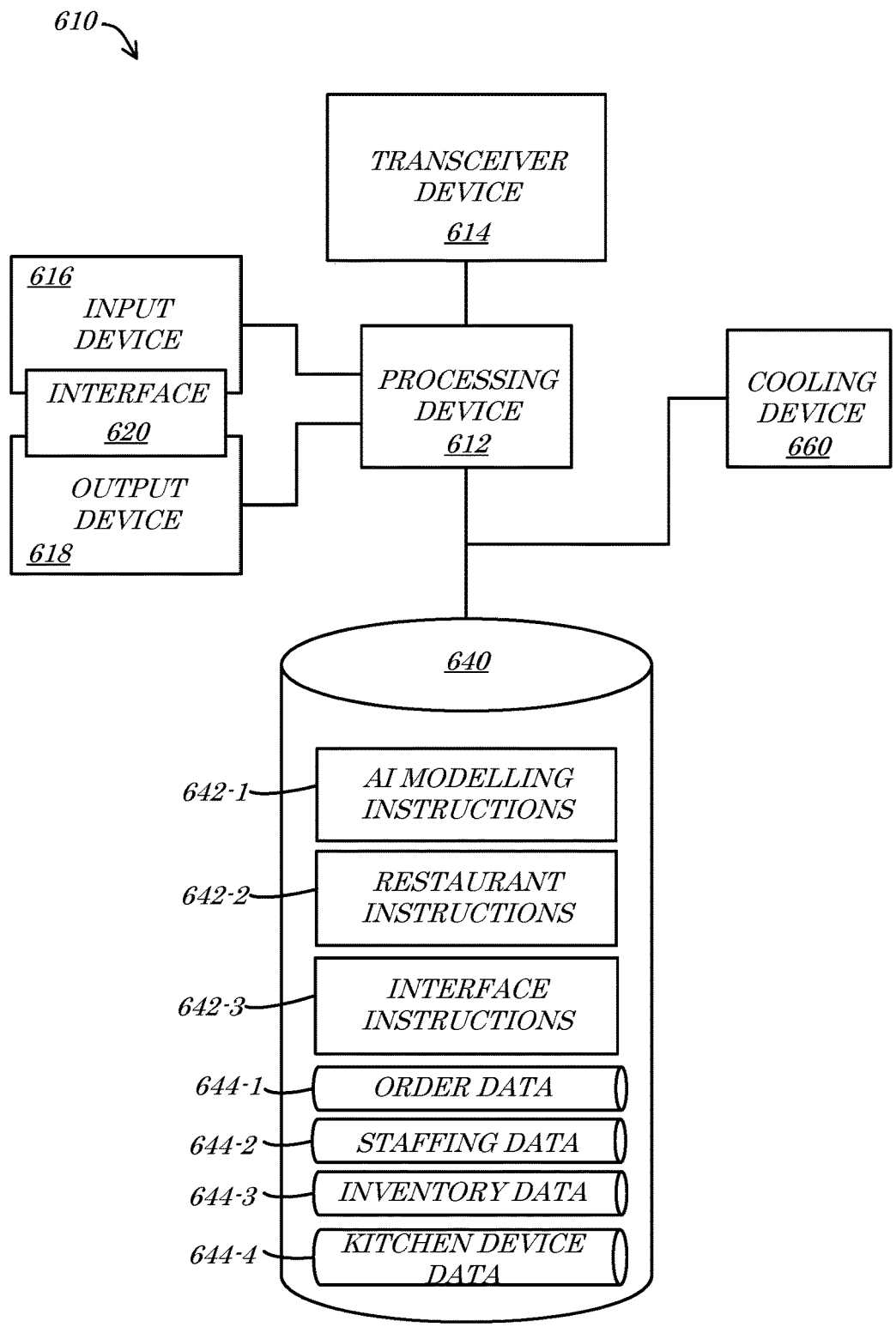
FIG. 6 is a block diagram of an apparatus according to some embodiments.
Figure 7A:
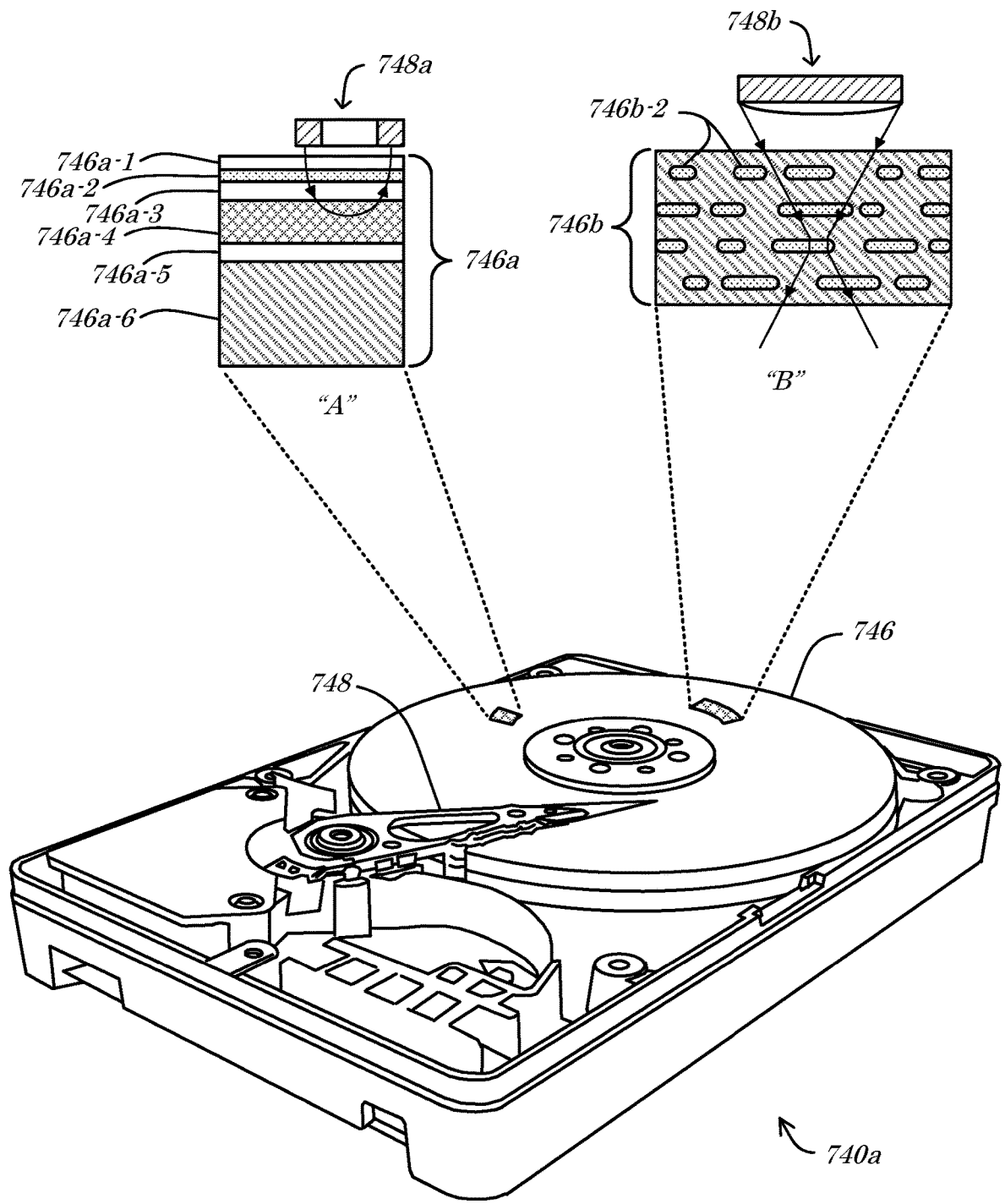
FIG. 7A, FIG. 7B, FIG. 7C, FIG. 7D, and FIG. 7E are perspective diagrams of exemplary data storage devices according to some embodiments.
Figure 7B:
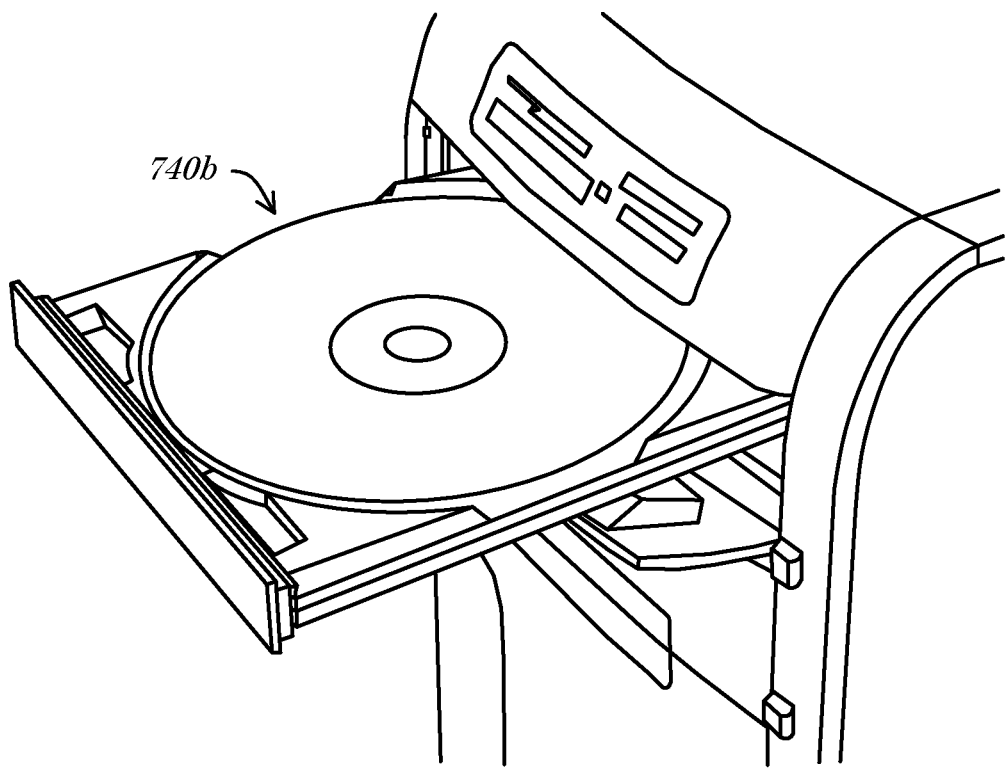
Figure 7C:
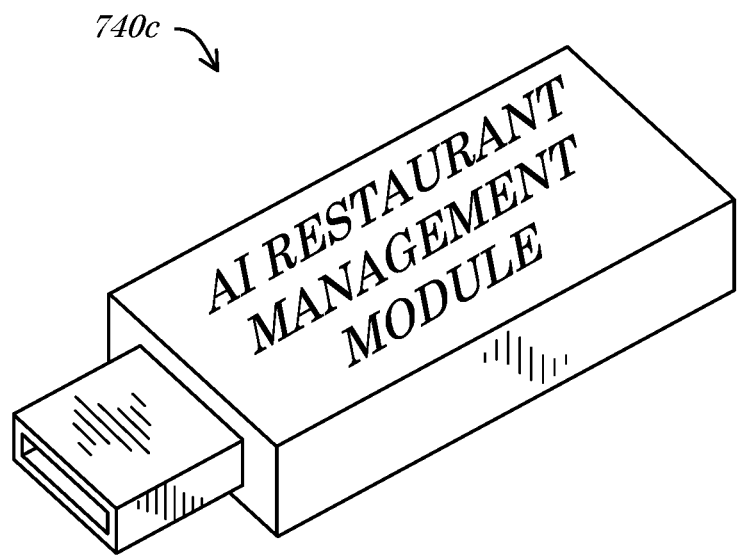
Figure 7D:
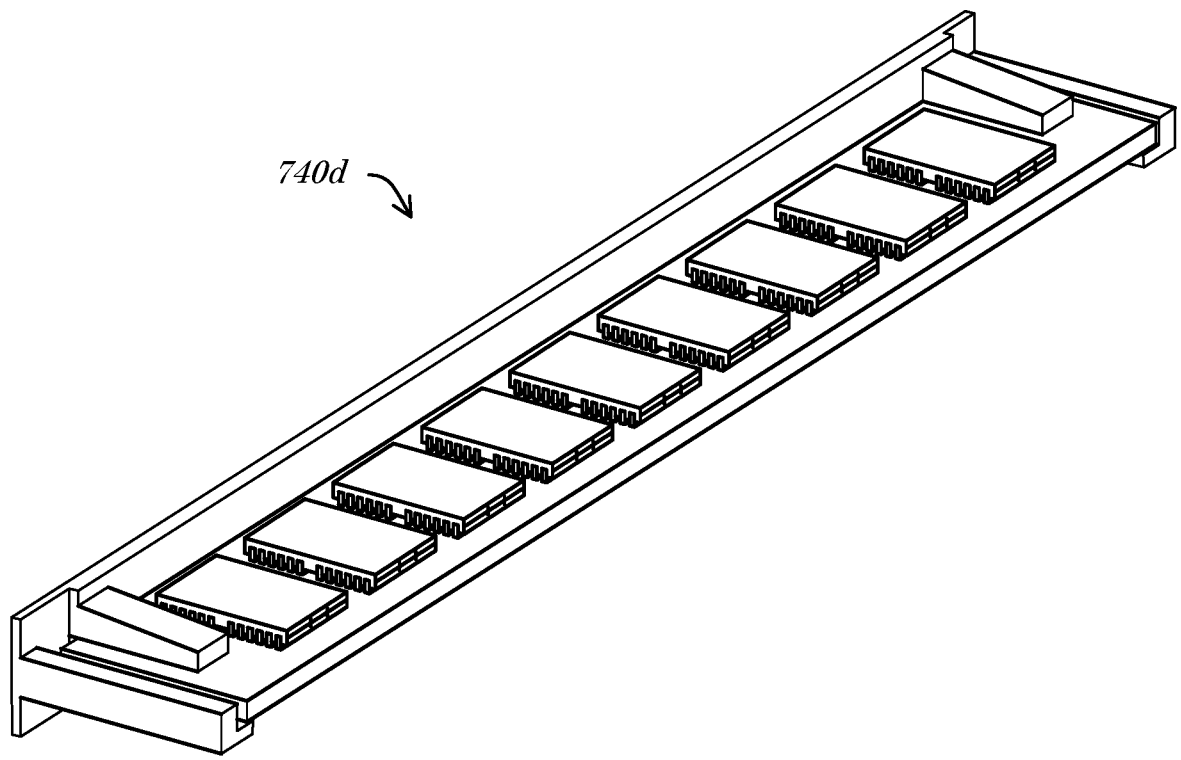
Figure 7E:
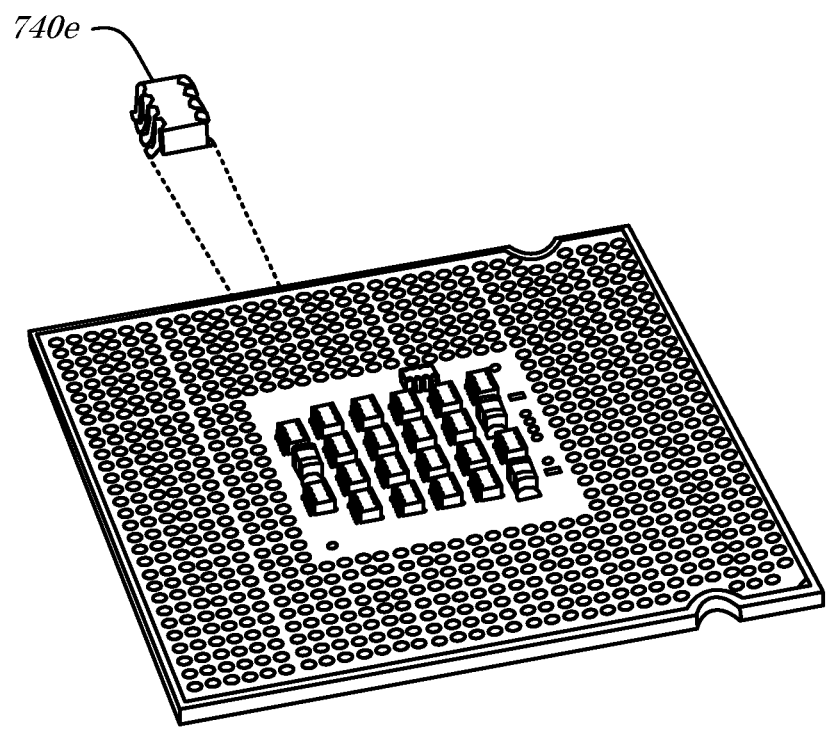

Turning to FIG. 6, a block diagram of an apparatus 610 according to some embodiments is shown. In some embodiments, the apparatus 610 may be similar in configuration and/or functionality to one or more of the ordering/customer devices 102*a-n*, 202*a-b*, 302, 402, the third-party and/or kitchen devices 106, 206*a-c*, 306*a-f*, 406 and/or the server/controller devices, and/or apparatus 110, 210*a-c*, 410, 610, all of FIG. 1, FIG. 2, FIG. 3, FIG. 4, and/or FIG. 6 herein. The apparatus 610 may, for example, execute, process, facilitate, and/or otherwise be associated with the methods/algorithms 400, 500, 800 of FIG. 4, FIG. 5A, FIG. 5B, and/or FIG. 8 herein, and/or portions or combinations thereof. In some embodiments, the apparatus 610 may comprise a processing device 612, a communications or transceiver device 614, an input device 616, an output device 618, an interface 620, a memory device 640 (storing various programs and/or instructions 642 and data 644), and/or a cooling device 660. According to some embodiments, any or all of the components 612, 614, 616, 618, 620, 640, 642, 644, 660 of the apparatus 610 may be similar in configuration and/or functionality to any similarly named and/or numbered components described herein. Fewer or more components 612, 614, 616, 618, 620, 640, 642, 644, 660 and/or various configurations of the components 612, 614, 616, 618, 620, 640, 642, 644, 660 may be included in the apparatus 610 without deviating from the scope of embodiments described herein.

According to some embodiments, the processor 612 may be or include any type, quantity, and/or configuration of processor that is or becomes known. The processor 612 may comprise, for example, an Intel® IXP 2800 network processor or an Intel® XEON™ Processor coupled with an Intel® E7501 chipset. In some embodiments, the processor 612 may comprise multiple interconnected processors, microprocessors, and/or micro-engines. According to some embodiments, the processor 612 (and/or the apparatus 610 and/or other components thereof) may be supplied power via a power supply (not shown), such as a battery, an Alternating Current (AC) source, a Direct Current (DC) source, an AC/DC adapter, solar cells, and/or an inertial generator. In the case that the apparatus 610 comprises a server, such as a blade server, necessary power may be supplied via a standard AC outlet, power strip, surge protector, and/or Uninterruptible Power Supply (UPS) device.

In some embodiments, the communications/transceiver device 614 may comprise any type or configuration of communication device that is or becomes known or practicable. The communication device 614 may, for example, comprise a Network Interface Card (NIC), a telephonic device, a cellular network device, a router, a hub, a modem, and/or a communications port or cable. In some embodiments, the communication device 614 may be coupled to receive order data, e.g., from a consumer and/or kitchen device (not shown in FIG. 6). The communication device 614 may, for example, comprise a BLE and/or RF receiver device and/or a camera or other imaging device that acquires data from a user (not separately depicted in FIG. 6) and/or a transmitter device that provides the data to a remote server and/or server or communications layer (also not separately shown in FIG. 6). According to some embodiments, the communication device 614 may also or alternatively be coupled to the processor 612. In some embodiments, the communication device 614 may comprise an infrared (IR), RF, Bluetooth™, NFC, and/or Wi-Fi® network device coupled to facilitate communications between the processor 612 and another device (such as a remote user device, not separately shown in FIG. 6).

In some embodiments, the input device 616 and/or the output device 618 are communicatively coupled to the processor 612 (e.g., via wired and/or wireless connections and/or pathways) and they may generally comprise any types or configurations of input and output components and/or devices that are or become known, respectively. The input device 616 may comprise, for example, a keyboard that allows an operator of the apparatus 610 to interface with the apparatus 610 (e.g., by a consumer and/or KDS device, to define and/or provide order data, as described herein). In some embodiments, the input device 616 may comprise a sensor, such as a camera, sound, light, and/or proximity sensor, configured to measure parameter values and report measured values via signals to the apparatus 610 and/or the processor 612. The output device 618 may, according to some embodiments, comprise a display screen and/or other practicable output component and/or device. The output device 618 may, for example, provide an interface (such as the interface 620) via which functionality for omnichannel AI restaurant management is provided to a user (e.g., via a website and/or mobile application). According to some embodiments, the input device 616 and/or the output device 618 may comprise and/or be embodied in a single device, such as a touch-screen monitor.

The memory device 640 may comprise any appropriate information storage device that is or becomes known or available, including, but not limited to, units and/or combinations of magnetic storage devices (e.g., a hard disk drive), optical storage devices, and/or semiconductor memory devices such as RAM devices, Read Only Memory (ROM) devices, Single Data Rate Random Access Memory (SDR-RAM), Double Data Rate Random Access Memory (DDR-RAM), and/or Programmable Read Only Memory (PROM). The memory device 640 may, according to some embodiments, store one or more of AI modelling instructions 642-1, restaurant instructions 642-2, interface instructions 642-3, order data 644-1, staffing data 644-2, inventory data 644-3, and/or kitchen device data 644-4. In some embodiments, the AI modelling instructions 642-1, restaurant instructions 642-2, interface instructions 642-3, order data 644-1, staffing data 644-2, inventory data 644-3, and/or kitchen device data 644-4 may be utilized by the processor 612 to provide output information via the output device 618 and/or the communication device 614.

According to some embodiments, the AI modelling instructions 642-1 may be operable to cause the processor 612 to process the order data 644-1, staffing data 644-2, inventory data 644-3, and/or kitchen device data 644-4 in accordance with embodiments as described herein. Order data 644-1, staffing data 644-2, inventory data 644-3, and/or kitchen device data 644-4 received via the input device 616 and/or the communication/transceiver device 614 may, for example, be analyzed, sorted, filtered, decoded, decompressed, ranked, scored, plotted, and/or otherwise processed by the processor 612 in accordance with the AI modelling instructions 642-1. In some embodiments, order data 644-1, staffing data 644-2, inventory data 644-3, and/or kitchen device data 644-4 may be fed by the processor 612 through one or more mathematical, AI logic (e.g., neural network), rules-based, and/or statistical formulas and/or models in accordance with the AI modelling instructions 642-1 to analyze, predict, compute, alter, set, and/or manage restaurant operation parameters, as described herein.

In some embodiments, the restaurant instructions 642-2 may be operable to cause the processor 612 to process the order data 644-1, staffing data 644-2, inventory data 644-3, and/or kitchen device data 644-4 in accordance with embodiments as described herein. Order data 644-1, staffing data 644-2, inventory data 644-3, and/or kitchen device data 644-4 received via the input device 616 and/or the communication device 614 may, for example, be analyzed, sorted, filtered, decoded, decompressed, ranked, scored, plotted, and/or otherwise processed by the processor 612 in accordance with the restaurant instructions 642-2. In some embodiments, order data 644-1, staffing data 644-2, inventory data 644-3, and/or kitchen device data 644-4 may be fed by the processor 612 through one or more mathematical, AI logic (e.g., neural network), rules-based, and/or statistical formulas and/or models in accordance with the restaurant instructions 642-2 to set a first restaurant operational parameter to keep a second restaurant operational parameter within predefined thresholds, as described herein.

According to some embodiments, the interface instructions 642-3 may be operable to cause the processor 612 to process the order data 644-1, staffing data 644-2, inventory data 644-3, and/or kitchen device data 644-4 in accordance with embodiments as described herein. Order data 644-1, staffing data 644-2, inventory data 644-3, and/or kitchen device data 644-4 received via the input device 616 and/or the communication device 614 may, for example, be analyzed, sorted, filtered, decoded, decompressed, ranked, scored, plotted, and/or otherwise processed by the processor 612 in accordance with the interface instructions 642-3. In some embodiments, order data 644-1, staffing data 644-2, inventory data 644-3, and/or kitchen device data 644-4 may be fed by the processor 612 through one or more mathematical, AI logic (e.g., neural network), rules-based, and/or statistical formulas and/or models in accordance with the interface instructions 642-3 to provide various interfaces to consumers, companies, and/or other users to facilitate restaurant operations, as described herein.

According to some embodiments, the apparatus 610 may comprise the cooling device 660. According to some embodiments, the cooling device 660 may be coupled (physically, thermally, and/or electrically) to the processor 612 and/or to the memory device 640. The cooling device 660 may, for example, comprise a fan, heat sink, heat pipe, radiator, cold plate, and/or other cooling component or device or combinations thereof, configured to remove heat from portions or components of the apparatus 610.

Any or all of the exemplary instructions and data types described herein and other practicable types of data may be stored in any number, type, and/or configuration of memory devices that is or becomes known. The memory device 640 may, for example, comprise one or more data tables or files, databases, table spaces, registers, and/or other storage structures. In some embodiments, multiple databases and/or storage structures (and/or multiple memory devices 640) may be utilized to store information associated with the apparatus 610. According to some embodiments, the memory device 640 may be incorporated into and/or otherwise coupled to the apparatus 610 (e.g., as shown) or may simply be accessible to the apparatus 610 (e.g., externally located and/or situated).

Referring to FIG. 7A, FIG. 7B, FIG. 7C, FIG. 7D, and FIG. 7E, perspective diagrams of exemplary data storage devices 740*a-e* according to some embodiments are shown. The data storage devices 740*a-e* may, for example, be utilized to store instructions and/or data, such as the AI modelling instructions 642-1, restaurant instructions 642-2, interface instructions 642-3, order data 644-1, staffing data 644-2, inventory data 644-3, and/or kitchen device data 644-4, each of which is presented in reference to FIG. 6 herein. In some embodiments, instructions stored on the data storage devices 740*a-e* may, when executed by a processor, cause the implementation of and/or facilitate the methods/algorithms 400, 500, 800 of FIG. 4, FIG. 5A, FIG. 5B, and/or FIG. 8 herein, and/or portions or combinations thereof.

According to some embodiments, the first data storage device 740*a* may comprise one or more various types of internal and/or external hard drives. The first data storage device 740*a* may, for example, comprise a data storage medium 746 that is read, interrogated, and/or otherwise communicatively coupled to and/or via a disk reading device 748. In some embodiments, the first data storage device 740*a* and/or the data storage medium 746 may be configured to store information utilizing one or more magnetic, inductive, and/or optical means (e.g., magnetic, inductive, and/or optical-encoding). The data storage medium 746, depicted as a first data storage medium 746*a* for example (e.g., breakout cross-section "A"), may comprise one or more of a polymer layer 746*a*-1, a magnetic data storage layer 746*a*-2, a non-magnetic layer 746*a*-3, a magnetic base layer 746*a*-4, a contact layer 746*a*-5, and/or a substrate layer 746*a*-6. According to some embodiments, a magnetic read head 748*a* may be coupled and/or disposed to read data from the magnetic data storage layer 746*a*-2.

In some embodiments, the data storage medium 746, depicted as a second data storage medium 746*b* for example (e.g., breakout cross-section "B"), may comprise a plurality of data points 746*b*-2 disposed with the second data storage medium 746*b*. The data points 746*b*-2 may, in some embodiments, be read and/or otherwise interfaced with via a laser-enabled read head 748*b* disposed and/or coupled to direct a laser beam through the second data storage medium 746*b*.

In some embodiments, the second data storage device 740*b* may comprise a CD, CD-ROM, DVD, Blu-Ray™ Disc, and/or other type of optically-encoded disk and/or other storage medium that is or becomes know or practicable. In some embodiments, the third data storage device 740*c* may comprise a USB keyfob, dongle, and/or other type of flash memory data storage device that is or becomes know or practicable. In some embodiments, the fourth data storage device 740*d* may comprise RAM of any type, quantity, and/or configuration that is or becomes practicable and/or desirable. In some embodiments, the fourth data storage device 740*d* may comprise an off-chip cache such as a Level 2 (L2) cache memory device. According to some embodiments, the fifth data storage device 740*e* may comprise an on-chip memory device such as a Level 1 (L1) cache memory device.

The data storage devices 740*a-e* depicted in FIG. 7A, FIG. 7B, FIG. 7C, FIG. 7D, and FIG. 7E are representative of a class and/or subset of computer-readable media that are defined herein as "computer-readable memory" (e.g., non-transitory memory devices as opposed to transmission devices or media). The data storage devices 740*a-e* may generally store program instructions, algorithms, software engines, code, and/or modules that, when executed by a processing device cause a particular machine to function in accordance with one or more embodiments described herein.

Figure 8:
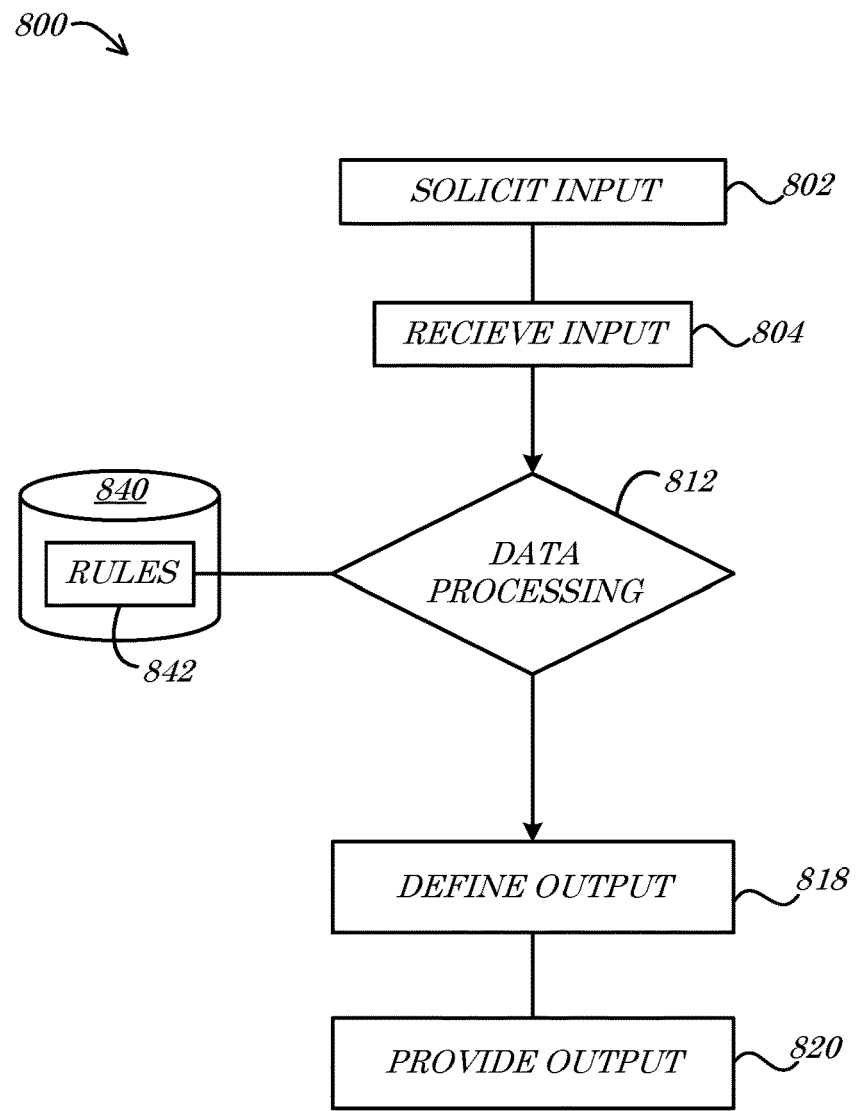
FIG. 8 is flowchart of an algorithm according to some embodiments.

With reference to FIG. 8, for example, the data storage devices 740*a-e* may store and/or define an algorithm 800. The algorithm 800 may comprise, for example, one or more software programs, modules, engines, and/or applications coded to perform any of the methods 400, 500 of FIG. 4, FIG. 5A, and/or FIG. 5B herein, and/or portions or combinations thereof. The algorithm 800, and any reference to the term "algorithm" herein, refers to any set of defined instructions that operate upon input to define and/or provide output. The algorithm 800 may, for example, be specifically programmed and/or otherwise defined to instruct a computer or other device (not shown) to solve a particular problem (e.g., logical) and/or resolve a particular mathematical calculation (e.g., arithmetic). In some embodiments, the algorithm 800 may be written and/or defined as a series or sequence of instructions encoded in (e.g., written in accordance with syntax and/or semantics rules) a particular computer programming language (e.g., Python™, Java™, JavaScript™, C, C++, C#, Basic™, FORTRAN, COBOL, Ruby™, and/or Perl™), e.g., a set of instructions that convert and/or encode characters, objects, and/or other data elements into machine code (e.g., code operable to be executed by an electronic processing device such as a CPU).

According to some embodiments, the algorithm 800 may comprise soliciting input, at 802. Input from one or more sources may be searched for and/or queried, by structuring and/or executing a database query and/or by sending a data communication signal or "handshake", such as is common with Bluetooth® short-range communication protocols. In some embodiments, the algorithm 800 may comprise receiving the input, at 804. Whether solicited or otherwise provided and/or acquired (e.g. loaded and/or downloaded), for example, the input for the algorithm 800 may be received, identified, and/or otherwise processed and/or located. According to some embodiments, the algorithm 800 may comprise data processing, at 812. The data processing 812 may, for example, comprise execution of one or more logical and/or computational procedures, modules, scripts, and/or routines that may be stored in a memory device 840 (e.g., similar to the data storage devices 740*a-e*) as a set of instructions or rules 842 and/or that may defined and/or implemented by one or more electrical, mechanical, and/or physical components, such as logic gates, diodes, transistors, relays, and/or switches (e.g., operable to execute any of the methods 400, 500 of FIG. 4, FIG. 5A, and/or FIG. 5B herein, and/or portions or combinations thereof).

In some embodiments, execution of the algorithm 800 may comprise a loading of the rules 842 into the memory 840 and/or into an electronic processing system (not shown) and/or an activation of one or more logic gates and/or other electrical and/or mechanical components. The algorithm 800 may operate upon the input in accordance with the rules 842 to achieve a result by defining output, at 818. The algorithm 800 may, for example, generate, produce, define, identify, calculate, and/or otherwise compute output based on an application of the data processing 812 utilizing the rules 842 and any or all input receiving at 804. According to some embodiments, the algorithm 800 may comprise providing the output, at 820. One or more output devices (not shown) may be utilized to convey the output (e.g., a result, conclusion, decision, etc.) to one or more other devices and/or entities (not shown), such as one or more users, consumers, customers, potential customers, and/or devices utilized thereby. The output may be displayed via an electronic display screen of a computer, mobile/smart phone, smart watch, etc., and/or may be transmitted as one or more electronic signals to one or more network destination addresses, such as e-mail addresses, URL locations, MAC addresses, and/or broadcast radio frequencies.

According to some embodiments, the data processing at 812 may comprise execution of a listing, sequence, matrix, and/or other set of stored steps and/or instructions that utilize the input to define the output. In some embodiments, the listing of steps and/or instruction details may comprise elements that are known to those skilled in the art. The algorithm 800 may partially or completely comprise, for example, instructions and/or steps that are well known, such as steps and/or instructions operable to calculate an area (length times width), volume (length times width times height), distance (difference between two locations), velocity (distance over time), acceleration (velocity over time), and/or any other known mathematical and/or logical (if/then statements) procedures. For any and all known procedures and/or instructions, the discrete details of such instructions are represented by the data processing at 812 and are not listed herein as one of ordinary skill in the art would readily comprehend both what such technological knowledge entails and that the inventor has possession of such knowledge. Instructions that may be included within and/or comprise the data processing at 812 (and/or the algorithm 800) may include, for example, but are not limited to, any known or practicable: (i) OCR algorithms, (ii) GUI object behavior algorithms, (iii) data transmission algorithms, (iv) data encoding algorithms, (v) data decoding algorithms, (vii) logical and/or mathematical data comparison algorithms, and (viii) data searching (e.g., keyword searching) algorithms.

V. Multiple Inventive Embodiments Disclosed

Multiple inventive embodiments may be set forth and described in this disclose. Some embodiments may comprise and/or define various systems, methods, articles of manufacture, apparatus, and/or devices that are either stand-alone or may be utilized together. If described as stand-alone, this does not necessarily preclude interoperability with the other disclosed embodiments. Indeed, by being included in the same disclosure, Applicant has anticipated some degree of relation between the disclosed embodiments. If described as cooperative, this does not necessarily preclude stand-alone or alternative operability. Particularly with respect to described systems, for example, while various components are described in relation to their interoperability in some embodiments, in other embodiments one or more of such components may be operative to function without the other (and/or with another component, whether disclosed or not). As such, Applicant expressly reserves the right to pursue inventive material in accordance with any differently numbered set of figures, or combinations or portions thereof, in different application filings.

This disclosure may accordingly contain multiple inventive embodiments that may individually comprise inventive material, despite being described in certain embodiments with other inventive material. Different objects disclosed in different numbered figure sets, for example, may in some cases comprise different inventive components that alone constitute the broadest extents of the disclosure herein (e.g., with or without the other different numbered figure set components). In some embodiments, the combination and/or interaction of a subset of the components may comprise inventive subject matter. The interaction of a KDS device with an omnichannel AI restaurant management device may, for example, be inventive with or without any of the other components. Similarly, an AI model that predicts order fulfillment time based on kitchen data may be effectuated by a subset of the components without the others being necessary.

In some embodiments, each of the separate components of the omnichannel AI restaurant management modeling system may comprise different and/or stand-alone inventions. The omnichannel AI restaurant management system that predicts fulfillment times based on semantic order clustering with one or more of the described features and/or components may comprise a first invention, for example, while the omnichannel AI restaurant management system that automatically adjusts one or more of order channel and/or kitchen device settings (e.g., based on fulfillment time predictions) with one or more of the described features and/or components thereof may comprise a second invention. In some embodiments the different inventive subject matter and/or inventions may be utilized together in one or more combined systems or configurations (which themselves may be considered different inventive combinations) while in other embodiments the different inventive subject matter and/or inventions may be utilized separately from one another. Similarly, while each component described herein is described with respect to various possible features and/or configurations, each component may exist, in some embodiments, with only a single such described feature and/or configuration. In some embodiments, each separate set of drawings provided with the specification may comprise a separate and/or stand-alone invention.

VI. Rules of Interpretation

Throughout the description herein and unless otherwise specified, the following terms may include and/or encompass the example meanings provided. These terms and illustrative example meanings are provided to clarify the language selected to describe embodiments both in the specification and in the appended claims, and accordingly, are not intended to be generally limiting. While not generally limiting and while not limiting for all described embodiments, in some embodiments, the terms are specifically limited to the example definitions and/or examples provided. Other terms are defined throughout the present description.

Neither the Title (set forth at the beginning of the first page of this patent application) nor the Abstract (set forth at the end of this patent application) is to be taken as limiting in any way as the scope of the disclosed invention(s). Headings of sections provided in this patent application are for convenience only, and are not to be taken as limiting the disclosure in any way.

All definitions, as defined and used herein, should be understood to control over dictionary definitions, definitions in documents incorporated by reference, and/or ordinary meanings of the defined terms. The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

The indefinite articles "a" and "an," as used herein in the specification and in the claims, unless clearly indicated to the contrary, should be understood to mean "at least one" or "one or more".

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified, unless clearly indicated to the contrary.

When an ordinal number (such as "first", "second", "third" and so on) is used as an adjective before a term, that ordinal number is used (unless expressly specified otherwise) merely to indicate a particular feature, such as to distinguish that particular feature from another feature that is described by the same term or by a similar term. For example, a "first widget" may be so named merely to distinguish it from, e.g., a "second widget". Thus, the mere usage of the ordinal numbers "first" and "second" before the term "widget" does not indicate any other relationship between the two widgets, and likewise does not indicate any other characteristics of either or both widgets. For example, the mere usage of the ordinal numbers "first" and "second" before the term "widget" (1) does not indicate that either widget comes before or after any other in order or location; (2) does not indicate that either widget occurs or acts before or after any other in time; and (3) does not indicate that either widget ranks above or below any other, as in importance or quality. In addition, the mere usage of ordinal numbers does not define a numerical limit to the features identified with the ordinal numbers. For example, the mere usage of the ordinal numbers "first" and "second" before the term "widget" does not indicate that there must be no more than two widgets.

An enumerated list of items (which may or may not be numbered) does not imply that any or all of the items are mutually exclusive, unless expressly specified otherwise. Likewise, an enumerated list of items (which may or may not be numbered) does not imply that any or all of the items are comprehensive of any category, unless expressly specified otherwise. For example, the enumerated list "a computer, a laptop, a PDA" does not imply that any or all of the three items of that list are mutually exclusive and does not imply that any or all of the three items of that list are comprehensive of any category.

Some embodiments described herein are associated with an "order device", an "ordering device", a "user device", a "customer device", or a "network device". As used herein, the terms "order device", "ordering device", "user device", "customer device", and "network device" may be used interchangeably and may generally refer to any device that can communicate via a network. Examples of user or network devices include a PC, a workstation, a server, a printer, a scanner, a facsimile machine, a copier, a Personal Digital Assistant (PDA), a storage device (e.g., a disk drive), a hub, a router, a switch, and a modem, a video game console, or a wireless phone. User and network devices may comprise one or more communication or network components. As used herein, a "user" may generally refer to any individual and/or entity that operates a user device. Users may comprise, for example, customers, consumers, product underwriters, product distributors, customer service representatives, agents, brokers, etc.

As used herein, the term "network component" may refer to a user or network device, or a component, piece, portion, or combination of user or network devices. Examples of network components may include a Static Random Access Memory (SRAM) device or module, a network processor, and a network communication path, connection, port, or cable.

In addition, some embodiments are associated with a "network" or a "communication network". As used herein, the terms "network" and "communication network" may be used interchangeably and may refer to any object, entity, component, device, and/or any combination thereof that permits, facilitates, and/or otherwise contributes to or is associated with the transmission of messages, packets, signals, and/or other forms of information between and/or within one or more network devices. Networks may be or include a plurality of interconnected network devices. In some embodiments, networks may be hard-wired, wireless, virtual, neural, and/or any other configuration of type that is or becomes known. Communication networks may include, for example, one or more networks configured to operate in accordance with the Fast Ethernet LAN transmission standard 802.3-2002® published by the Institute of Electrical and Electronics Engineers (IEEE). In some embodiments, a network may include one or more wired and/or wireless networks operated in accordance with any communication standard or protocol that is or becomes known or practicable.

As used herein, the terms "information" and "data" may be used interchangeably and may refer to any data, text, voice, video, image, message, bit, packet, pulse, tone, waveform, and/or other type or configuration of signal and/or information. Information may comprise information packets transmitted, for example, in accordance with the Internet Protocol Version 6 (IPv6) standard as defined by "Internet Protocol Version 6 (IPv6) Specification" RFC 1883, published by the Internet Engineering Task Force (IETF), Network Working Group, S. Deering et al. (December 1995). Information may, according to some embodiments, be compressed, encoded, encrypted, and/or otherwise packaged or manipulated in accordance with any method that is or becomes known or practicable.

In addition, some embodiments described herein are associated with an "indication". As used herein, the term "indication" may be used to refer to any indicia and/or other information indicative of or associated with a subject, item, entity, and/or other object and/or idea. As used herein, the phrases "information indicative of" and "indicia" may be used to refer to any information that represents, describes, and/or is otherwise associated with a related entity, subject, or object. Indicia of information may include, for example, a code, a reference, a link, a signal, an identifier, and/or any combination thereof and/or any other informative representation associated with the information. In some embodiments, indicia of information (or indicative of the information) may be or include the information itself and/or any portion or component of the information. In some embodiments, an indication may include a request, a solicitation, a broadcast, and/or any other form of information gathering and/or dissemination.

As utilized herein, the terms "program" or "computer program" may refer to one or more algorithms formatted for execution by a computer. The term "module" or "software module" refers to any number of algorithms and/or programs that are written to achieve a particular output and/or output goal—e.g., a 'login credentialing' module (or program) may provide functionality for permitting a user to login to a computer software and/or hardware resource and/or a 'shipping' module (or program) may be programmed to electronically initiate a shipment of an object via a known and/or available shipping company and/or service (e.g., FedEX®). The terms "engine" or "software engine" refer to any combination of software modules and/or algorithms that operate upon one or more inputs to define one or more outputs in an ongoing, cyclical, repetitive, and/or loop fashion. Data transformation scripts and/or algorithms that query data from a data source, transform the data, and load the transformed data into a target data repository may be termed 'data transformation engines', for example, as they repetitively operate in an iterative manner upon each row of data to produce the desired results.

Numerous embodiments are described in this patent application, and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural, logical, software, and electrical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

Devices that are in communication with each other need not be in continuous communication with each other, unless expressly specified otherwise. On the contrary, such devices need only transmit to each other as necessary or desirable, and may actually refrain from exchanging data most of the time. For example, a machine in communication with another machine via the Internet may not transmit data to the other machine for weeks at a time. In addition, devices that are in communication with each other may communicate directly or indirectly through one or more intermediaries.

A description of an embodiment with several components or features does not imply that all or even any of such components and/or features are required. On the contrary, a variety of optional components are described to illustrate the wide variety of possible embodiments of the present invention(s). Unless otherwise specified explicitly, no component and/or feature is essential or required.

Further, although process steps, algorithms or the like may be described in a sequential order, such processes may be configured to work in different orders. In other words, any sequence or order of steps that may be explicitly described does not necessarily indicate a requirement that the steps be performed in that order. The steps of processes described herein may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention, and does not imply that the illustrated process is preferred.

"Determining" something can be performed in a variety of manners and therefore the term "determining" (and like terms) includes calculating, computing, deriving, looking up (e.g., in a table, database or data structure), ascertaining and the like. The term "computing" as utilized herein may generally refer to any number, sequence, and/or type of electronic processing activities performed by an electronic device, such as, but not limited to looking up (e.g., accessing a lookup table or array), calculating (e.g., utilizing multiple numeric values in accordance with a mathematic formula), deriving, and/or defining.

It will be readily apparent that the various methods and algorithms described herein may be implemented by, e.g., appropriately and/or specially-programmed computers and/or computing devices. Typically a processor (e.g., one or more microprocessors) will receive instructions from a memory or like device, and execute those instructions, thereby performing one or more processes defined by those instructions. Further, programs that implement such methods and algorithms may be stored and transmitted using a variety of media (e.g., computer readable media) in a number of manners. In some embodiments, hard-wired circuitry or custom hardware may be used in place of, or in combination with, software instructions for implementation of the processes of various embodiments. Thus, embodiments are not limited to any specific combination of hardware and software.

A "processor" generally means any one or more microprocessors, CPU devices, computing devices, microcontrollers, digital signal processors, or like devices, as further described herein.

The term "computer-readable medium" refers to any medium that participates in providing data (e.g., instructions or other information) that may be read by a computer, a processor or a like device. Such a medium may take many forms, including but not limited to, non-volatile media, volatile media, and transmission media. Non-volatile media include, for example, optical or magnetic disks and other persistent memory. Volatile media include DRAM, which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during RF and IR data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave, or any other medium from which a computer can read.

The term "computer-readable memory" may generally refer to a subset and/or class of computer-readable medium that does not include transmission media, such as waveforms, carrier waves, electromagnetic emissions, etc. Computer-readable memory may typically include physical media upon which data (e.g., instructions or other information) are stored, such as optical or magnetic disks and other persistent memory, DRAM, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, computer hard drives, backup tapes, Universal Serial Bus (USB) memory devices, and the like.

Various forms of computer readable media may be involved in carrying data, including sequences of instructions, to a processor. For example, sequences of instruction (i) may be delivered from RAM to a processor, (ii) may be carried over a wireless transmission medium, and/or (iii) may be formatted according to numerous formats, standards or protocols, such as Bluetooth™, TDMA, CDMA, 3G.

Where databases are described, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats (including relational databases, object-based models and/or distributed databases) could be used to store and manipulate the data types described herein. Likewise, object methods or behaviors of a database can be used to implement various processes, such as the described herein. In addition, the databases may, in a known manner, be stored locally or remotely from a device that accesses data in such a database.

The present invention can be configured to work in a network environment including a computer that is in communication, via a communications network, with one or more devices. The computer may communicate with the devices directly or indirectly, via a wired or wireless medium, such as the Internet, LAN, WAN or Ethernet, Token Ring, or via any appropriate communications means or combination of communications means. Each of the devices may comprise computers, such as those based on the Intel® Pentium® or Centrino™ processor, that are adapted to communicate with the computer. Any number and type of machines may be in communication with the computer.

The present disclosure provides, to one of ordinary skill in the art, an enabling description of several embodiments and/or inventions. Some of these embodiments and/or inventions may not be claimed in the present application, but may nevertheless be claimed in one or more continuing applications that claim the benefit of priority of the present application. Applicant intends to file additional applications to pursue patents for subject matter that has been disclosed and enabled but not claimed in the present application.

It will be understood that various modifications can be made to the embodiments of the present disclosure herein without departing from the scope thereof. Therefore, the above description should not be construed as limiting the disclosure, but merely as embodiments thereof. Those skilled in the art will envision other modifications within the scope of the invention as defined by the claims appended hereto.

What is claimed is:

1. An omnichannel Artificial Intelligence (AI) restaurant management system, comprising:
an electronic processing device; and a non-transitory computer-readable memory storing (i) an omnichannel AI restaurant management model trained with a data set of previous omnichannel ordering data that includes both internal and external data sources, (ii) restaurant management rules, and (ii) instructions that when executed by the electronic processing device result in:
identifying a plurality of current orders at a restaurant, the plurality of current orders comprising orders from a plurality of ordering channels, the plurality of ordering channels comprising at least an in-store ordering channel and a delivery service ordering channel;
computing, by a first execution of the omnichannel AI restaurant management model, a predicted fulfillment time for each order of the plurality of current orders at the restaurant;
identifying, by an execution of the restaurant management rules, that at least one of the predicted fulfillment times exceeds a predetermined threshold;
computing, by a second execution of the omnichannel AI restaurant management model, an order channel value that would result in fulfillment times for future orders meeting the predetermined threshold;
identifying an in-kitchen device associated with the order channel value;
identifying, based on the order channel value, at least one of the ordering channels from the plurality of ordering channels;
transmitting a command signal that changes a current value of a parameter for the at least one of the ordering channels to the order channel value; and
transmitting a second command signal to the identified in-kitchen device that causes an adjustment to the in-kitchen device.

2. The AI restaurant management system of claim 1, wherein the at least one of the ordering channels further comprises an online ordering channel.

3. The AI restaurant management system of claim 1, wherein the delivery service ordering channel comprises a third-party ordering channel.

4. The AI restaurant management system of claim 1, wherein the changing of the current value of the parameter for the at least one of the ordering channels causes the ordering channel to be turned off.

5. The AI restaurant management system of claim 1, wherein the changing of the current value of the parameter for the at least one of the ordering channels causes the ordering channel to be limited to a maximum number of orders per period of time.

6. The AI restaurant management system of claim 1, wherein the changing of the current value of the parameter for the at least one of the ordering channels causes the ordering channel to be limited to orders having a value over a predetermined value threshold amount.

7. The AI restaurant management system of claim 1, wherein the changing of the current value of the parameter for the at least one of the ordering channels causes the ordering channel to be limited to one of a plurality of predesignated types of customers.

8. The AI restaurant management system of claim 1, wherein the changing of the current value of the parameter for the at least one of the ordering channels causes the ordering channel to be limited to orders placed within a certain geographic area.

9. The AI restaurant management system of claim 7, wherein the one of the plurality of predesignated types of customers comprises a type of customer identified by one or more of: (i) a particular customer account identifier, (ii) a particular financial account identifier, and (iii) a customer of a particular demographic.

10. The AI restaurant management system of claim 1, wherein the plurality of ordering channels further comprises at least an online ordering platform channel and a mobile device ordering channel.

11. The AI restaurant management system of claim 1, wherein the in-kitchen device comprises one or more of an oven, a grill, a cooktop, a warmer, a conveyer, a fryer, a refrigerator, and a freezer.

12. The AI restaurant management system of claim 1, wherein the computing of the predicted fulfillment time for each order of the plurality of current orders at the restaurant, comprises:
(i) identifying at least one semantic component from each order;
(ii) grouping together orders that have a semantic similarity, thereby defining a semantic order cluster;

(iii) identifying a number of items in each order; and
(iv) computing, based on a comparison of the semantic order cluster and the number of items in each order to model data, the predicted fulfillment time.

\* \* \* \* \*